US009823555B2

United States Patent
Takizawa

(10) Patent No.: US 9,823,555 B2
(45) Date of Patent: Nov. 21, 2017

(54) OPTICAL PATH CHANGING DEVICE AND PROJECTOR

(71) Applicant: Seiko Epson Corporation, Tokyo (JP)

(72) Inventor: Takahiro Takizawa, Suzaka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/174,170

(22) Filed: Jun. 6, 2016

(65) Prior Publication Data

US 2016/0363847 A1    Dec. 15, 2016

(30) Foreign Application Priority Data

Jun. 11, 2015  (JP) .................... 2015-118092
Jun. 11, 2015  (JP) .................... 2015-118093

(51) Int. Cl.
  *G03B 21/16*  (2006.01)
  *G02B 7/18*  (2006.01)
  *G03B 21/20*  (2006.01)

(52) U.S. Cl.
  CPC .......... *G03B 21/16* (2013.01); *G02B 7/1815* (2013.01); *G03B 21/2013* (2013.01); *G03B 21/2066* (2013.01)

(58) Field of Classification Search
  CPC .. G03B 21/16; G03B 21/208; G03B 21/2013; G03B 21/2066; G03B 21/2093; H04N 9/3141; H04N 9/3144; H04N 9/3164
  See application file for complete search history.

(56) References Cited

U.S. PATENT DOCUMENTS

| 8,480,239 | B2* | 7/2013 | Sato | G02B 27/283 345/9 |
| 8,540,377 | B2* | 9/2013 | Kawai | G03B 21/16 353/52 |
| 2002/0033904 | A1 | 3/2002 | Yamamoto et al. | |
| 2006/0033889 | A1* | 2/2006 | Terashima | H01J 5/50 353/85 |
| 2008/0094581 | A1* | 4/2008 | Nakagawa | G03B 21/145 353/58 |
| 2009/0290130 | A1* | 11/2009 | Nishimura | G03B 21/16 353/52 |
| 2010/0208215 | A1* | 8/2010 | Wada | G03B 21/2066 353/57 |
| 2011/0216287 | A1* | 9/2011 | Kitamura | G03B 21/16 353/61 |
| 2013/0182229 | A1 | 7/2013 | Saruwatari et al. | |

FOREIGN PATENT DOCUMENTS

| JP | 2002-90877 A | 3/2002 |
| JP | 2004-219458 A | 8/2004 |
| JP | 2013-148625 A | 8/2013 |

* cited by examiner

*Primary Examiner* — Sultan Chowdhury
(74) *Attorney, Agent, or Firm* — ALG Intellectual Property, LLC

(57) ABSTRACT

An optical path changing device includes: a reflective member that reflects a light beam incident thereto, in a predetermined reflection direction; and a housing holding the reflective member. The housing has a first surface and a second surface with the reflective member interposed therebetween in a direction orthogonal to the reflection direction. The first surface and the second surface have openings, respectively, and a cooling gas is circulated from the opening in the first surface to the opening in the second surface.

16 Claims, 23 Drawing Sheets

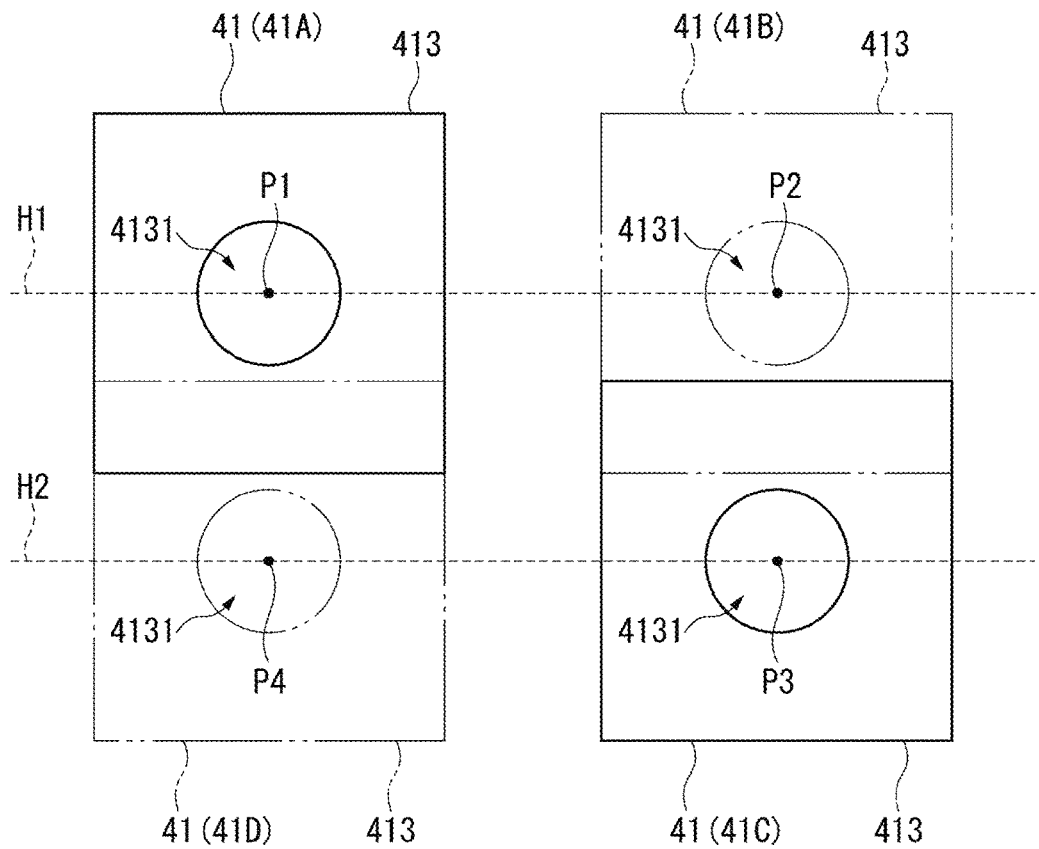
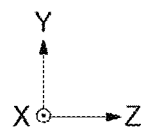
FIG. 5

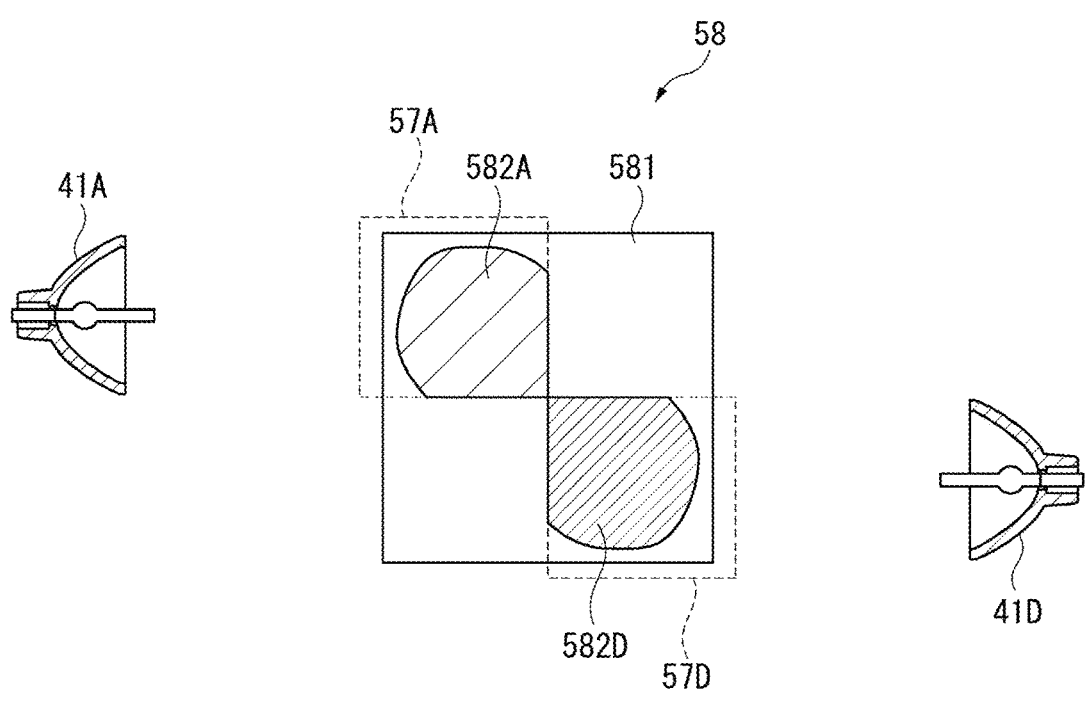
FIG. 6
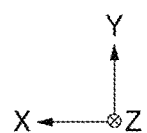

OPTICAL PATH CHANGING DEVICE AND PROJECTOR

CROSS REFERENCE TO RELATED APPLICATION

The entire disclosure of Japanese Patent Application No. 2015-118092, filed Jun. 11, 2015, and No. 2015-118093, filed Jun. 11, 2015, are expressly incorporated by reference herein.

BACKGROUND

1. Technical Field

The present invention relates to an optical path changing device and a projector.

2. Related Art

In the related art, there has been known a projector that includes an illuminating device, a light modulating device which modulates a light beam emitted from the illuminating device and which forms an image in response to image information, and a projecting optical device which performs enlarged projection of the image on a projection-target surface such as a screen.

As such a projector, there has been known a projector that includes an illuminating device which combines light beams emitted from a plurality of lamps and emits an illumination light beam (for example, see JP-A-2002-90877).

The illuminating device of the projector disclosed in JP-A-2002-90877 includes two light sources disposed to face each other and an optical path changing member disposed between the two light sources, and two other light sources similarly disposed to face each other and another optical path changing member disposed between the two light sources. Light beams emitted from the respective light sources are reflected from the optical path changing member (reflective member), collimated, and then, are emitted outside the illuminating device.

Incidentally, the optical path changing members in the illuminating device disclosed in JP-A-2002-90877 receive an influence of heat generated from the incident light beams, and thereby there is a concern that the positions of the optical path changing members can be shifted from designed positions and it is not possible to reflect a light beam emitted from the light source, at an intended reflection position. Therefore, there is a demand for a configuration in which it is possible to efficiently cool an optical path changing member (reflective member). In addition, since an optical component such as the optical path changing members of the illuminating device disclosed in JP-A-2002-90877 is directly fixed in the illuminating device, for example, a problem arises in that, in a case where members constituting the illuminating device are low in accuracy, it is not possible to fix the optical path changing member (reflective member) at an intended position and angle. Therefore, there is a demand for a configuration in which it is possible to fix a reflective member with high accuracy.

SUMMARY

An advantage of some aspects of the invention is to provide an optical path changing device and a projector in which it is possible to efficiently cool a reflective member.

An optical path changing device according to a first aspect of the invention includes: a reflective member that reflects a light beam incident thereto, in a predetermined reflection direction; and a housing holding the reflective member. The housing has a first surface and a second surface with the reflective member interposed therebetween in a direction orthogonal to the reflection direction. The first surface and the second surface have openings, respectively, and a cooling gas is circulated from the opening in the first surface to the opening in the second surface.

According to the first aspect, since the cooling gas is circulated in the housing in a direction substantially orthogonal to the reflective surface of the reflective member and to a surface thereof on the side in a direction opposite to the reflective surface, it is possible to cool the reflective member and it is possible to discharge the cooling gas after cooling the reflective member, outside the housing. Hence, it is possible to efficiently cool the reflective member.

In the first aspect, it is preferable that the opening in the first surface and the opening in the second surface are formed at positions, respectively, at which the cooling gas is circulated to a side opposite to a reflective surface of the reflective member.

Here, dust is contained in the cooling gas circulating in the housing in some cases and, when the cooling gas circulates on the reflective surface side of the reflective member, there is a possibility that the dust will be attached on the reflective surface. In such a case, there is a concern that reflection efficiency of the light beam from the reflective member will be lowered.

In this respect, according to the first aspect with the configuration described above, since the cooling gas circulates on the side opposite to the reflective surface of the reflective member, it is possible to lower the possibility that the dust will be attached to the reflective surface of the reflective member, compared to the case where the cooling gas circulates on the reflective surface side of the reflective member. Hence, it is possible to suppress a decrease in the reflection efficiency of the light beam due to the attachment of the dust.

In the first aspect, it is preferable that the housing has a holding section that holds the reflective member, and the opening in the first surface and the opening in the second surface are formed at positions at which the cooling gas is circulated to at least one of the holding section and a surface of the reflective member on an opposite side to a reflective surface thereof.

The holding section includes a support wall that is upright from the inner surface of the housing and supports the reflective member. The holding section also includes a fixing member in a case where the fixing member that fixes the reflective member to the housing is provided.

According to the first aspect with the configuration described above, the cooling gas is circulated to at least one of the holding section and the surface of the reflective member on the opposite side to the reflective surface thereof. In the case where the cooling gas circulates to the surface on the opposite side thereto, it is possible to directly cool the reflective member with the cooling gas. In a case where the cooling gas circulates to the holding section, it is possible to cool the holding section, to which heat from the reflective member is transmitted, with the cooling gas, thereby making it possible to indirectly cool the reflective member. Hence, it is possible to efficiently cool the reflective member. Such circulation of cooling gas makes it possible to reduce circulation of the cooling gas on the reflective surface side and makes it possible to reliably reduce attachment of the dust contained in the cooling gas, on the reflective surface.

In the first aspect, it is preferable that the holding section is formed of a heat conductive material.

As the heat conductive material, it is possible to use a metal material such as an aluminum die cast product.

According to the first aspect with this configuration, since the holding section is formed of the heat conductive material, it is possible to reliably transmit the heat of the reflective member to the holding section, and the cooling gas circulates the holding section, thereby making it possible to reliably cool the reflective member.

A projector according to a second aspect of the invention includes: the optical path changing device described above, a light source unit that has a plurality of light sources which emit a light beam toward the optical path changing device; and a cooling device that circulates the cooling gas to the opening in the first surface.

According to the second aspect, it is possible to achieve the same effects as in the optical path changing device according to the first aspect. In addition, since the cooling gas circulates to the opening in the first surface by the cooling device, it is possible to reliably cool the optical path changing device.

An optical path changing device according to a third aspect of the invention includes: a reflective member that reflects a light beam incident thereto, in a direction; and a housing accommodating the reflective member. The housing has a first member and a second member, and the first member and the second member have substantially the same dimension in a direction in which the first member and the second member are assembled.

Here, in a case where the first member and the second member are formed by injection molding, there is a need to set a great draft for a member which has a large dimension in the assembled direction. At this time, in a case where the holding section (wall and groove) that is upright from one of the first member or the second member and holds the reflective member is formed, the holding member warps when the draft of the member is large. It is difficult to dispose the reflective member perpendicularly to the bottom and there is a possibility that the dispositional accuracy of the reflective member will become low.

In this respect, according to the third aspect, since the first member and the second member are configured to have substantially the same dimension in the direction in which the two members are assembled, it is possible to have substantially the same draft in the direction of the assembly of the first member and the second member, compared to a case where the housing is configured by assembling of a member having a large dimension in the assembled direction and a member having a small dimension therein. In this manner, even in a case where the holding sections are formed in the first member and the second member, respectively, it is possible to lower a possibility that the holding section will warp. Hence, the reflective member can be fixed to the housing with high accuracy.

In the third aspect, it is preferable that the first member and the second member have substantially the same shape.

According to the third aspect with this configuration, in a case where the first member and the second member are formed by injection molding using the same die, both can be manufactured by the same die. Therefore, it is possible to shorten the manufacturing time and it is possible to reduce manufacturing costs.

In the third aspect, it is preferable that the first member and the second member are molded by die casting.

Examples of the die casting can include, in addition to aluminum die casting, magnesium die casting, or the like.

According to the third aspect with this configuration, the first member and the second member are molded by die casting. Therefore, strength of the housing is improved, it is possible to reduce an occurrence of distortion due to the heat, and it is possible to fix the reflective member with high accuracy. In addition, since the first member and the second member are molded by the die casting, it is possible to increase heat conductivity of the housing which is configured of the assembly of the members and it is possible to highly efficiently transmit, to the housing, the heat based on the light beam incident to the reflective member.

In the third aspect, it is preferable that the optical path changing device further includes: an optical conversion component that is fixed to the housing and converts an optical property of a light beam reflected from the reflective member.

Examples of the optical conversion component can include, in addition to collimating lens, a uniformizing device that uniformizes the incident light beam.

According to the third aspect with this configuration, such an optical conversion component, thereby making it possible to improve general-purpose properties of the optical path changing device. In addition, it is possible to fix the optical conversion component to the housing with high accuracy.

In the third aspect, it is preferable that the optical path changing device further includes: a first bias member that is provided in the first member and biases the optical conversion component to the second member side; a groove which is positioned in the second member and in which the optical conversion component is disposed; and a second bias member that is disposed between the groove and the optical conversion component and biases the optical conversion component toward the inner surface of the groove.

According to the third aspect with this configuration, it is possible to reliably fix the optical conversion components to the housing with the first bias member and the second bias member on the first member side and on the second member side, respectively. Hence, it is possible to maintain an attachment state of the reflective member and the optical conversion components which are fixed to the housing with high accuracy.

A projector according to a fourth aspect of the invention includes: the optical path changing device described above; and a light source unit that has a plurality of light source devices which emit a light beam toward the optical path changing device.

According to the fourth aspect, it is possible to achieve the same effects as of the optical conversion device according to the third aspect.

BRIEF DESCRIPTION OF THE DRAWINGS

The invention will be described with reference to the accompanying drawings, wherein like numbers reference like elements.

FIG. 5 is a schematic view illustrating the light source device when viewed in a direction parallel to an emission direction of a light beam emitted from the light source device according to the embodiment.

FIG. 6 is a view illustrating the illuminating device according to the embodiment when viewed from a side in a direction opposite to the emission direction of the light beam.

DESCRIPTION OF EXEMPLARY EMBODIMENTS

Figure 1:
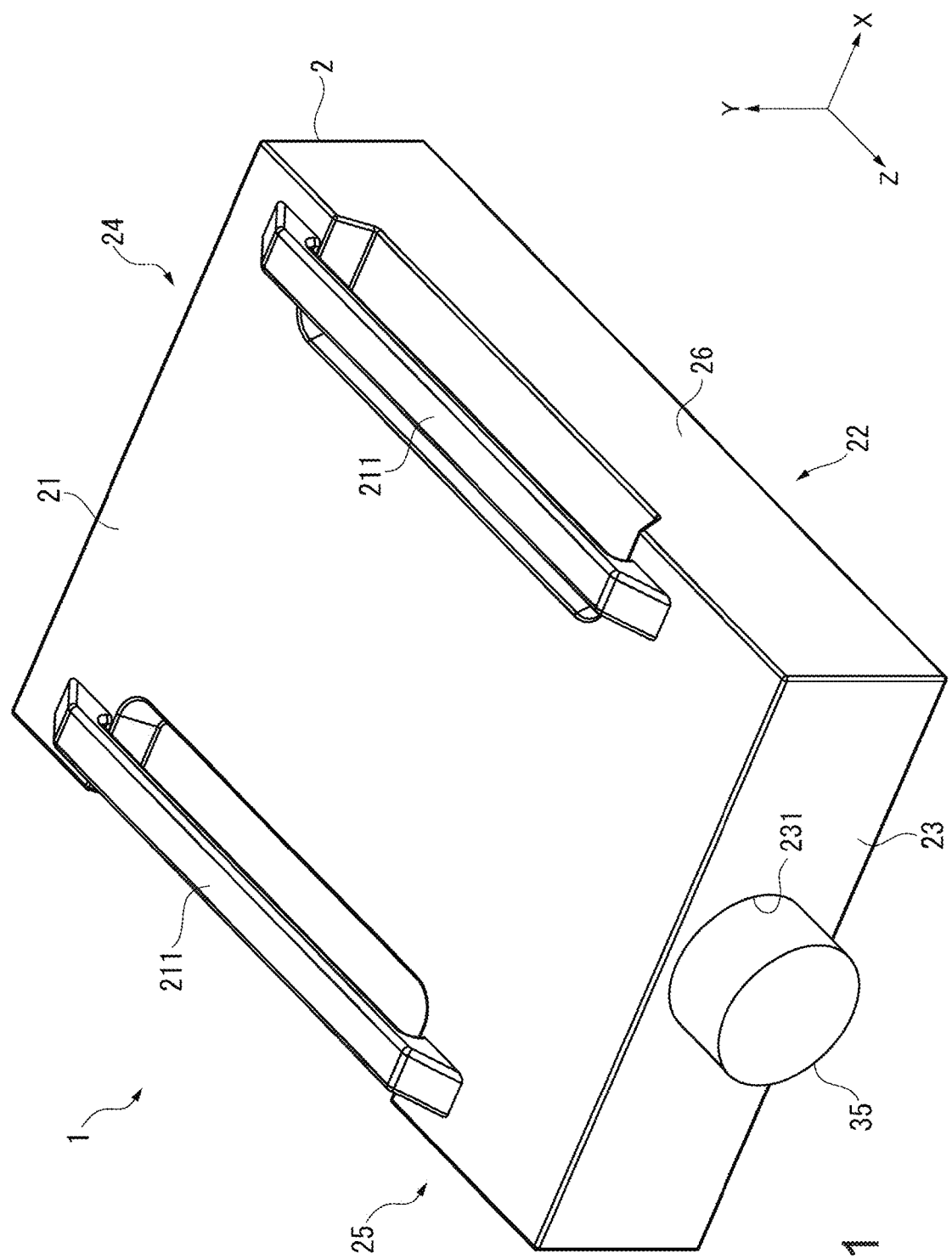
FIG. 1 is a perspective view schematically illustrating a projector according to an embodiment of the invention.

Hereinafter, an embodiment of the invention will be described on the basis of the drawings.
Configuration of External Appearance of Projector FIG. 1 is a perspective view schematically illustrating a projector 1 according to the present embodiment of the invention.

The projector 1 according to the present embodiment is a projection type display apparatus that modulates a light beam emitted from an illuminating device 31 which will be described below, forms an image in response to image information, and performs enlarged projection of the image on a projection-target surface such as a screen.

Figure 2:
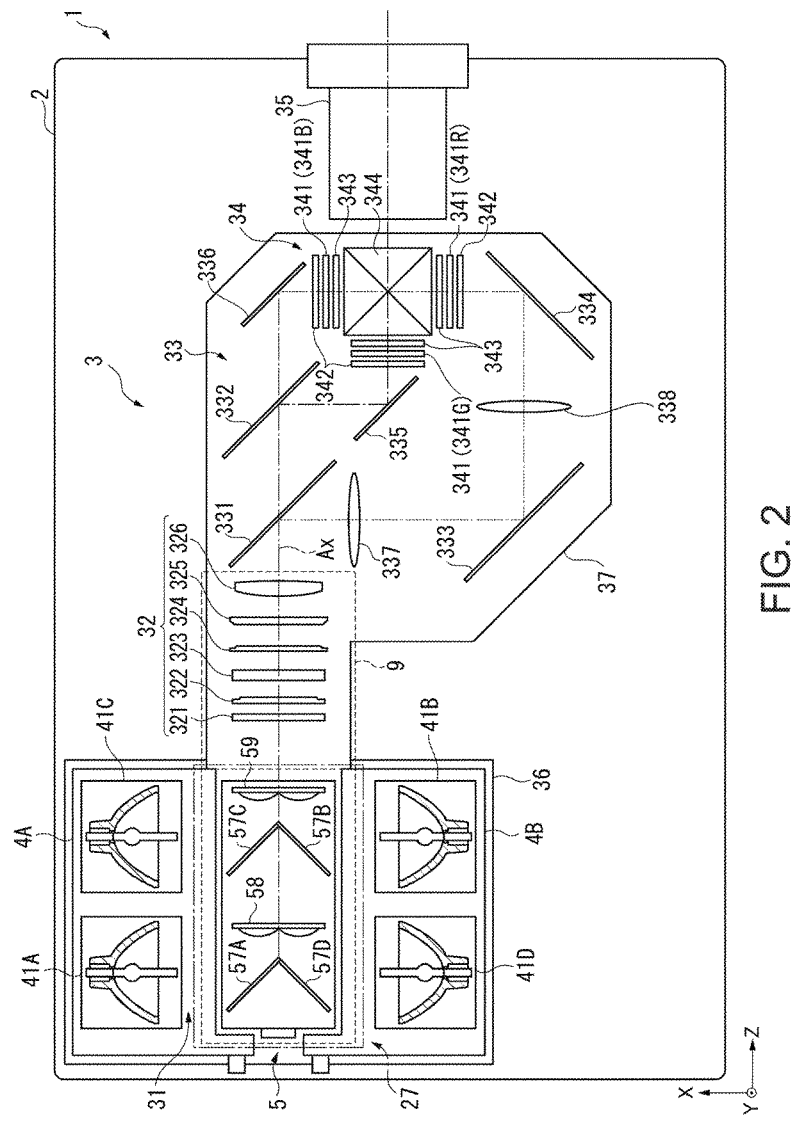
FIG. 2 is a schematic view illustrating an internal configuration of the projector according to the embodiment.

The projector 1 is a multi-lamp type projector including four light source devices 41A to 41D (refer to FIG. 2). Light beams emitted from the four light source devices 41A to 41D are reflected from an optical path changing device 5 to be parallel in the same direction, are emitted from the illuminating device 31, and are incident to a light modulating device through a plurality of optical components, which will be described below in detail.

An exterior housing 2 is formed to have substantially a rectangular parallelepiped shape having a top surface 21, a bottom surface 22, a front surface 23, a rear surface 24, a left side surface 25, and a right side surface 26.

On the top surface 21, a pair of grip sections 211 are provided and used when a user grips the projector 1 or fixes the projector 1 to a tool installed on a ceiling or the like.

On the bottom surface 22, a leg portion (not illustrated) that comes into contact with an installation surface when the projector is mounted on the installation surface such as an installation stage is provided.

An opening 231 is formed in the front surface 23 and a part of projecting optical device 35 constituting an image forming device 3 which will be described below is exposed through the opening.

An opening (not illustrated) is formed in the rear surface 24, is used to accommodate a first lamp unit 4A, a second lamp unit 4B which will be described below (refer to FIG. 2) and the optical path changing device 5 (refer to FIG. 2) in the exterior housing 2 in a replaceable manner, and is covered by a cover member (not illustrated).

Besides, although not illustrated, an introduction port, through which air is introduced from outside to inside of the exterior housing 2, is formed on the right side surface 26, and an exhaust port, through which air is discharged from inside to outside of the exterior housing 2 is formed on the left side surface 25.
Internal Configuration of Projector FIG. 2 is a schematic view illustrating an internal configuration of the projector 1.

As illustrated in FIG. 2, the projector 1 includes, in addition to the exterior housing 2, a cooling device 9 that cools the image forming device 3 and components of the projector 1 which are disposed in the exterior housing 2. In addition, an accommodation unit 27 in which the optical path changing device 5 is accommodated is provided in the exterior housing 2, which will be described below in detail. Besides, although not illustrated, the projector 1 includes a control device that controls the projector 1 and a power supply device that supplies power to the electronic components constituting the projector 1.
Configuration of Image Forming Device The image forming device 3 forms and projects an image in response to image information input from the control device. The image forming device 3 includes the illuminating device 31, a uniformizing device 32, a color separator 33, an electro-optical device 34, a projecting optical device 35, a base member 36, and an optical component housing 37.

Of the above components, the base member 36 connected to the optical component housing 37 has a function of accommodating and fixing the illuminating device 31.

In addition, the optical component housing 37 is a box-shaped housing in which an illumination optical axis Ax is set and the uniformizing device 32 and the color separator 33 are disposed at positions on the illumination optical axis Ax in the optical component housing 37. In addition, the illuminating device 31, the electro-optical device 34, and the projecting optical device 35 are positioned outside the optical component housing 37 and disposed according to the illumination optical axis Ax.

The illuminating device 31 emits a collimated light beam to the uniformizing device 32. A configuration of the illuminating device 31 will be described below in detail.

The uniformizing device 32 uniformizes illuminance in a plane orthogonal to the central axis of luminous flux emitted from the illuminating device 31. The uniformizing device 32 includes a cinema filter 321, a first lens array 322, a UV filter 323, a second lens array 324, a polarization converter 325, and a superimposing lens 326.

Of the above components, the polarization converter 325 aligns polarization directions of the incident light beams in one type of direction.

The color separator 33 separates the luminous flux incident from the uniformizing device 32 into three color beams of red (R), green (G), and blue (B). The color separator 33 includes dichroic mirrors 331 and 332, reflective mirrors 333 to 336, and relay lenses 337 and 338.

The electro-optical device 34 modulates the respective separated color beams in response to image information and then combines the modulated color beams. The electro-optical device 34 includes a liquid crystal panel 341 (liquid crystal panels for red, green, and blue correspond to 341R, 341G, and 341B, respectively) as a light modulating device provided for each color beam, an incidence-side polarization plate 342, and an emission-side polarization plate 343, and one color synthesis device 344. The color synthesis device 344 can employ a dichroic prism.

The projecting optical device 35 is a projection lens that performs enlarged projection of luminous flux (luminous flux forming an image) synthesized by the color synthesis device 344 on the projection-target surface. As the projecting optical device 35, a lens assembly formed of a plurality of lenses disposed in a lens tube can be employed.

Configuration of Illuminating Device

As illustrated in FIG. 2, the illuminating device 31 includes a plurality of light source devices fixed to the first lamp unit 4A and the second lamp unit 4B, respectively. The plurality of light source devices correspond to a plurality of light sources (first to fourth light sources) according to the invention and have four light source devices 41 (41A to 41D) in the present embodiment. Besides, the illuminating device 31 includes the optical path changing device 5 that reflects light beams emitted from the light source devices 41A to 41D and aligns and emits the light beams in a predetermined direction. In addition, the first lamp unit 4A includes the light source device 41A and the light source device 41C, and the second lamp unit 4B includes the light source device 41B and the light source device 41D. The first lamp unit 4A and the second lamp unit 4B are disposed on an X direction side and on a side in a direction opposite to the X direction, respectively, with the optical path changing device 5 interposed therebetween. Further, the first lamp unit 4A and the second lamp unit 4B correspond to a plurality of light source units according to the invention.

Configuration of Light Source Device

Figure 3:
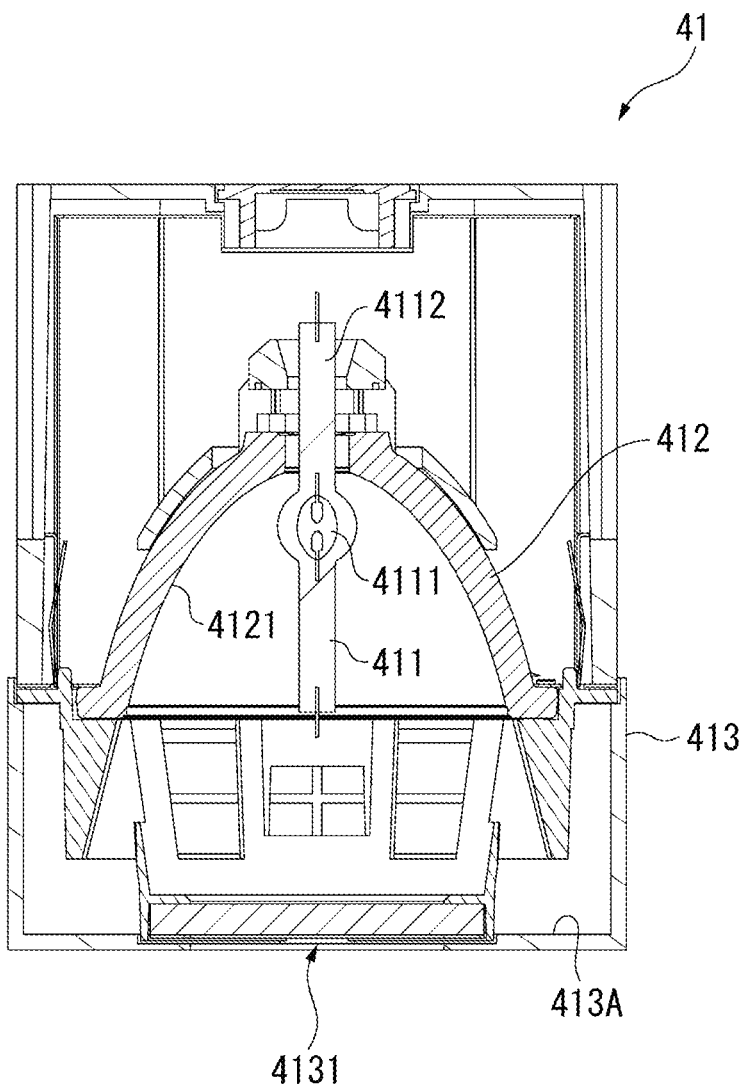
FIG. 3 is a sectional view of a light source device constituting an illuminating device according to the embodiment.

FIG. 3 is a sectional view illustrating a configuration of the light source device 41.

As illustrated in FIG. 2 and FIG. 3, the light source devices 41 include a luminous tube 411, a reflector 412 fixed to a sealing section 4112 positioned on one end side of the luminous tube 411, and an accommodation body 413 that accommodates the above components inside. Of the above components, the reflector 412 aligns and emits light beams emitted from the light emitting portion 4111 of the luminous tube 411 in one direction and is configured as an ellipsoidal reflector of which a reflective surface 4121 is an elliptical surface in the present embodiment.

The accommodation body 413 has a front surface 413A facing a reflective surface 4121 of the reflector 412 and includes an opening 4131 formed to allow a light beam reflected from the reflector 412 and a light beam that is directly incident from the light emitting portion 4111 to pass. The opening 4131 is formed by passing the center of the light emitting portion 4111 and with a virtual line as the center along the central axis of the luminous tube 411.

Disposition of Light Source Devices

Figure 4:
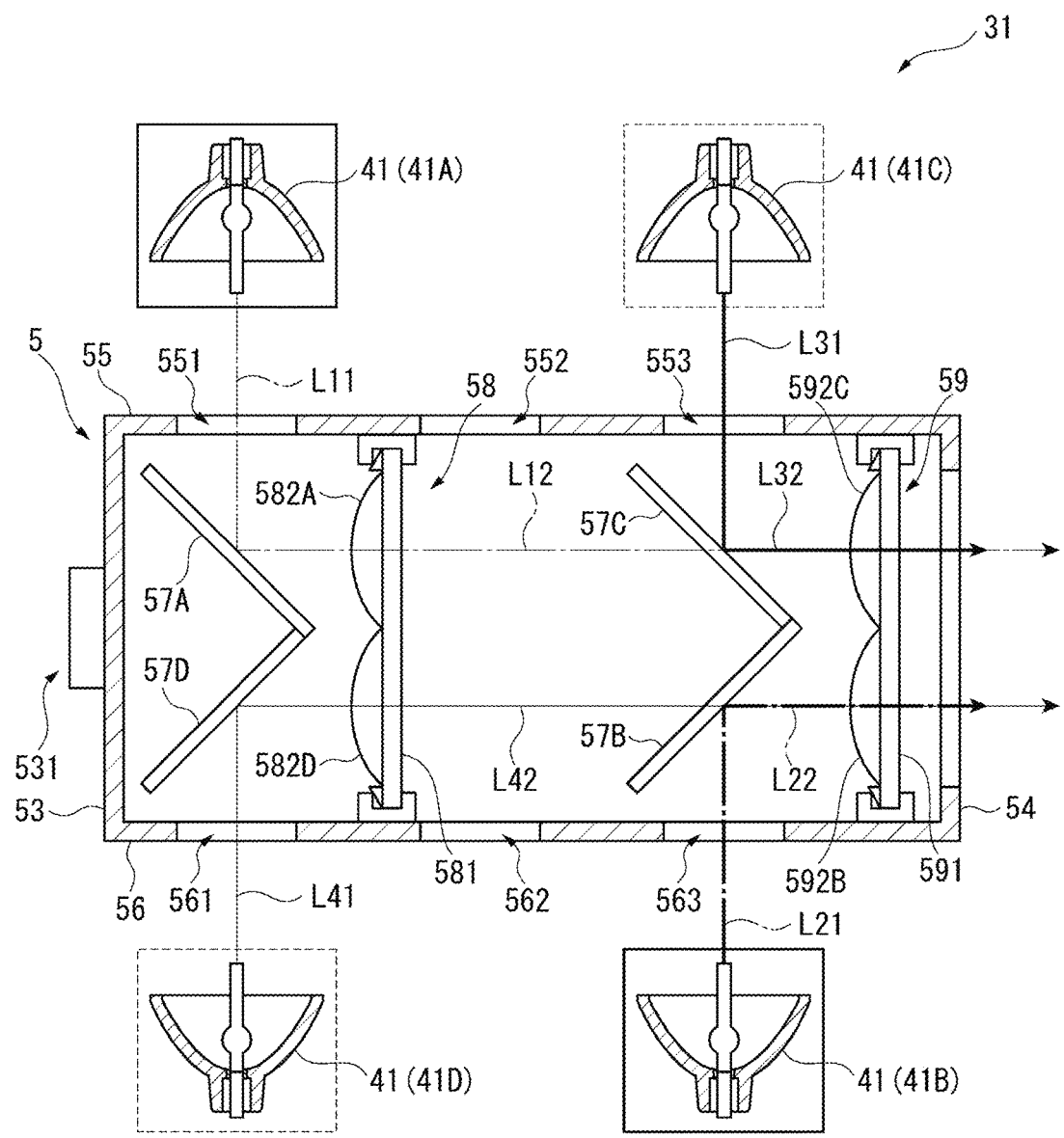
FIG. 4 is a schematic view illustrating a configuration of the illuminating device according to the embodiment.

FIG. 4 is a schematic view illustrating a disposition of the light source devices 41A to 41D. Further, in FIG. 4, the first and second lamp units 4A and 4B are omitted. In addition, the optical path changing device 5 is shown in a sectional view such that the internal structure thereof is to be easily understood.

Of the light source devices 41 (41A to 41D) having the configuration described above, as shown in FIG. 4, the light source devices 41A and 41C and the light source devices 41B and 41D are disposed on the sides opposite to each other with the optical path changing device 5 therebetween, and the light source devices 41A to 41D emit light beams toward the optical path changing device 5, respectively.

Further, in the following description, an emission direction of a light beam from the illuminating device 31 is a Z direction, and directions orthogonal to the Z direction and orthogonal to each other are an X direction and a Y direction. In the present embodiment, since the Z direction is a direction from the rear surface 24 toward the front surface 23 in the exterior housing 2, the X direction is a direction from the left side surface 25 toward the right side surface 26 in the exterior housing 2, and the Y direction is a direction from the bottom surface 22 toward the top surface 21 in the exterior housing 2.

The light source devices 41A and 41C are disposed on the X direction side from the optical path changing device 5 and the light source devices 41B and 41D are disposed on the side opposite to the X direction from the optical path changing device 5. Here, the light source device 41A and the light source device 41C are disposed in the order of the light source device 41A and the light source device 41C in the Z direction. Similarly, the light source device 41B and the light source device 41D are disposed in the order of the light source device 41D and the light source device 41B in the Z direction. In this manner, emitted light beams L11 and L31 emitted from the light source device 41A and the light source device 41C are emitted toward the direction opposite to the X direction, and emitted light beams L21 and L41 emitted from the light source device 41B and the light source device 41D are emitted toward the X direction.

FIG. 5 is a schematic view illustrating the light source devices 41A to 41D when viewed from the X direction side. Further, in FIG. 5, only the accommodation body 413 and the opening 4131 are illustrated in the light source devices 41A to 41D such that it is easy to understand a positional relationship between the light source devices 41A to 41D. In addition, the opening 4131 of the accommodation body 413, in which the light source devices 41A and 41C are accommodated, is depicted in a solid line and the opening 4131 of the accommodation body 413, in which the light source devices 41B and 41D are accommodated, is depicted in a dash line.

As illustrated in FIGS. 4 and 5, a dimension of the accommodation body 413 in the direction parallel to the Y direction is greater than a dimension of the opening 4131 in the same direction. Therefore, in the present embodiment, in a case where the light source device 41D is disposed outside the illumination region of the light source device 41A, there is no need to have different height positions by a dimension of the accommodation body 413 in the direction parallel to the Y direction, but the opening 4131 of the accommodation body 413 in the light source device 41A and the opening 4131 of the accommodation body 413 in the light source device 41D are disposed so as not to be overlapped in a state in which the respective height positions thereof are different in the direction parallel to the Y direction. In other words, a part of the accommodation body 413 of the light source device 41A and a part of the accommodation body 413 of the light source device 41D are overlapped when viewed from a direction parallel to the X direction. Similarly, in a case where the light source device 41C is disposed outside the illumination region of the light source device 41B, the opening 4131 of the accommodation body 413 in the light source device 41B and the opening 4131 of the accommodation body 413 in the light source device 41C are disposed so as not to be overlapped in a state in which the respective height positions thereof are different in the direction parallel to the Y direction. In other words, a part of the accommodation body 413 of the light source device 41B and a part of the accommodation body 413 of the light source device 41C are overlapped when viewed from a direction parallel to the X direction.

In addition, as illustrated in FIG. 5, a first plane H1 including the central axis P1 of the emitted light beam L11 emitted from the light source device 41A and the central axis P2 of the emitted light beam L21 emitted from the light source device 41B is parallel to and is separated from a second plane H2 including the central axis P3 of the emitted light beam L31 emitted from the light source device 41C and the central axis P4 of the emitted light beam L41 emitted from the light source device 41D. In other words, the light source device 41A and the light source device 41B are disposed substantially at the same height position in the direction parallel to the Y direction, and the light source device 41C and the light source device 41D are disposed substantially at the same height position different from the light source devices 41A and 41B.

Of the light source devices 41A to 41D disposed in this manner, the light beam emitted from the light source device 41A is incident to a reflective mirror 57A of the optical path changing device 5, and the light beam emitted from the light source device 41B is incident to a reflective mirror 57B. In addition, the light beam emitted from the light source device 41C is incident to a reflective mirror 57C, and the light beam emitted from the light source device 41D is incident to a reflective mirror 57D.

Schematic Configuration of Optical Path Changing Device

As described above, the optical path changing device 5 aligns and emits the light beams incident from the light source devices 41 (41A to 41D) in the Z direction and causes the light beams to be incident to the uniformizing device 32. The optical path changing device 5 includes a housing 50, the reflective mirrors 57 (57A to 57D) provided corresponding to the light source devices 41 (41A to 41D), a first lens 58, and a second lens 59. Further, the housing 50 that holds the reflective mirrors 57, the first lens 58, and the second lens 59 and a holding structure in the housing 50 will be described below.

The reflective mirror 57A reflects the light beam incident from the light source device 41A in the Z direction. In addition, the reflective mirror 57B reflects the light beam incident from the light source device 41B in the Z direction. Further, the reflective mirror 57C reflects the light beam incident from the light source device 41C in the Z direction. Furthermore, the reflective mirror 57D reflects the light beam incident from the light source device 41D in the Z direction. In other words, the reflective mirrors 57A to 57D have a function of reflecting the incident light beam in the Z direction (direction corresponding to a predetermined reflection direction according to the invention). In addition, the reflected light beams are incident to the uniformizing device 32 through the first and second lenses 58 and 59.

As illustrated in FIG. 4, the reflective mirror 57A and the reflective mirror 57D are disposed between the light source device 41A and the light source device 41D, and the reflective mirror 57B and the reflective mirror 57C are disposed between the light source device 41B and the light source device 41C. In addition, the first lens 58 is disposed between the reflective mirrors 57A and 57D and the reflective mirrors 57B and 57C, and the second lens 59 is disposed on the Z direction side from the reflective mirrors 57B and 57C.

Further, the reflective mirrors 57A to 57D correspond to reflective members according to the invention and the first lens 58 and the second lens 59 correspond to optical conversion components according to the invention.

Disposition of Reflective Mirrors

Figure 7:
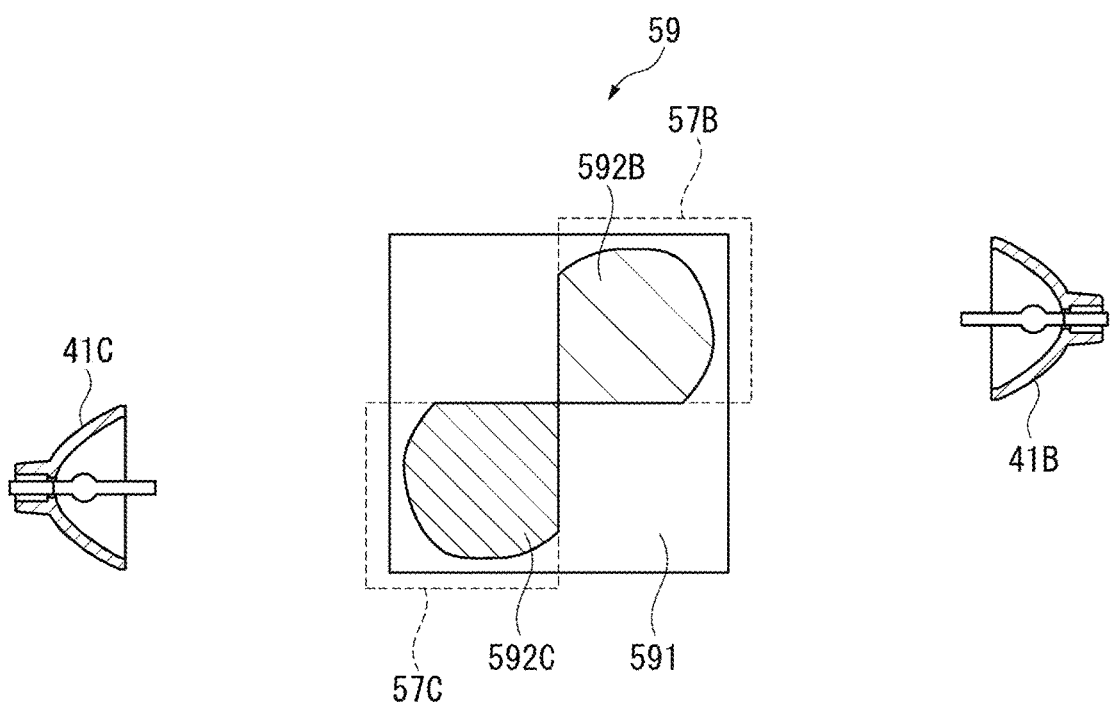
FIG. 7 is a view illustrating the illuminating device when viewed from the side in a direction opposite to the emission direction of the light beam, in a state in which a first reflective mirror, a second reflective mirror, and a first lens according to the embodiment are removed.

FIG. 6 is a view illustrating the illuminating device 31 when viewed from the side in a direction opposite to the Z direction. FIG. 7 is a view illustrating the illuminating device 31 when viewed from the side in the direction opposite to the Z direction, in a state in which the light source devices 41A and 41D, the reflective mirrors 57A and 57D, and the first lens 58 are removed. Further, in FIGS. 6 and 7, the reflective mirrors 57A to 57D are depicted in a dash line.

As illustrated in FIGS. 4 and 6, the reflective mirror 57A is disposed between the light source device 41A and the light source device 41D, and is disposed at a position facing the light source device 41A. In addition, the reflective mirror 57D is disposed between the light source device 41A and the light source device 41D, and is disposed at a position facing the light source device 41D.

As illustrated in FIGS. 4 and 7, the reflective mirror 57C is disposed between the light source device 41C and the light source device 41B, and is disposed at a position facing the light source device 41C. In addition, the reflective mirror 57B is disposed between the light source device 41C and the light source device 41B, and is disposed at a position facing the light source device 41B.

Configuration and Disposition of First Lens

Figure 8:
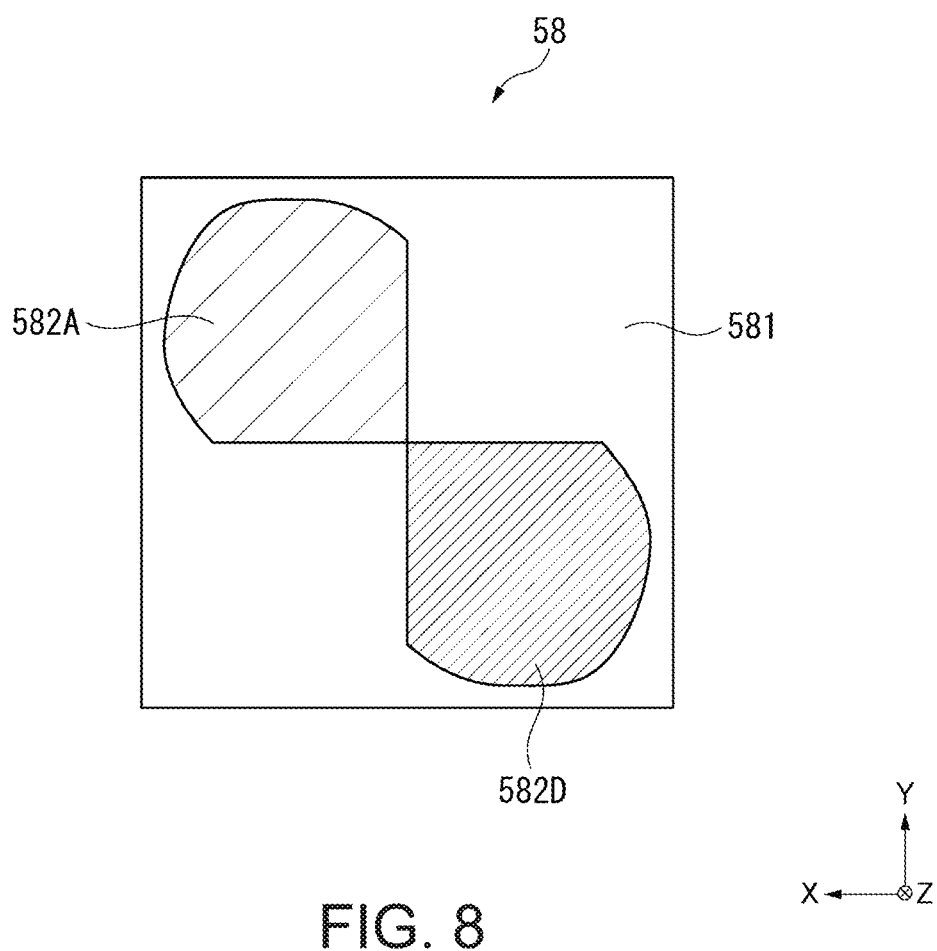
FIG. 8 is a schematic view illustrating the first lens of the illuminating device according to the embodiment.

FIG. 8 is a view illustrating the first lens 58 when viewed from the side in the direction opposite to the Z direction.

As illustrated in FIG. 8, the first lens 58 includes a substrate 581 and small lenses 582A and 582D. The small lenses 582A and 582D have a convex shape having a predetermined curvature and have a function of collimating an incident light beam. Further, the curvature of the small lenses 582A and 582D is set to be substantially the same.

In addition, the substrate 581 is formed to have a rectangular plate shape and the small lenses 582A and 582D are formed on a surface of the substrate 581 on the side in the direction opposite to the Z direction.

As illustrated in FIGS. 2 and 4, the first lens 58 is disposed between the reflective mirrors 57A and 57D and the reflective mirrors 57B and 57C in the direction parallel to the Z direction.

Configuration and Disposition of Second Lens

Figure 9:
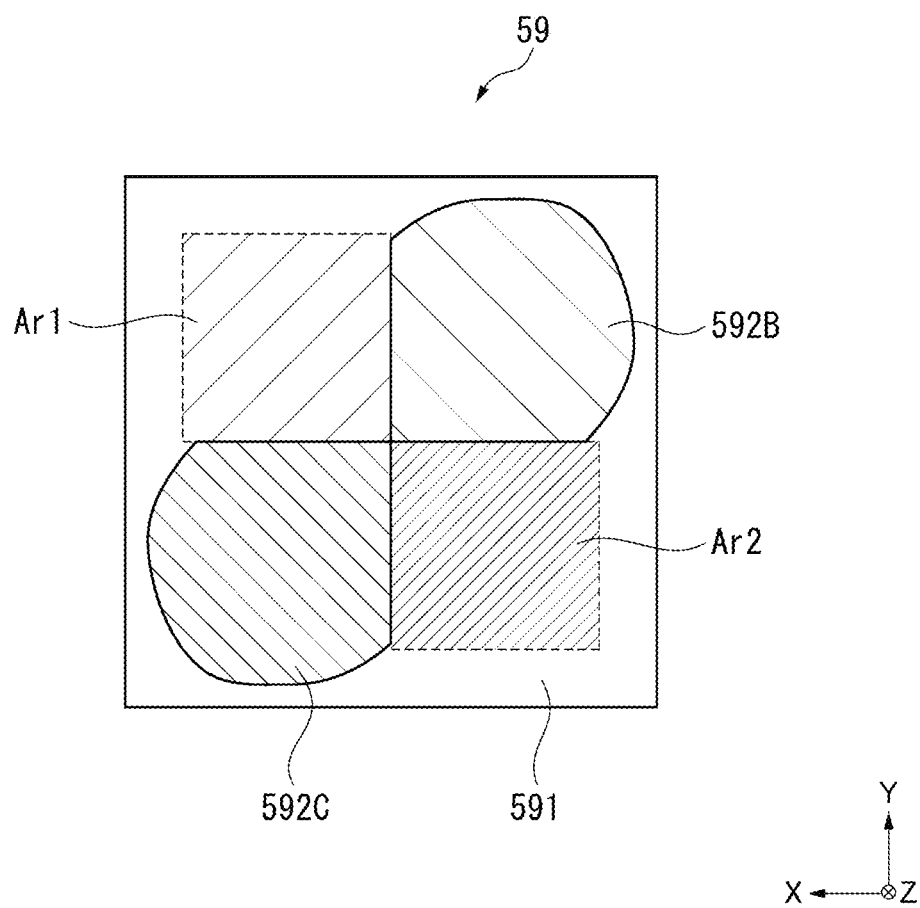
FIG. 9 is a schematic view illustrating the second lens of the illuminating device according to the embodiment.

FIG. 9 is a view illustrating the second lens 59 when viewed from the side in the direction opposite to the Z direction.

As illustrated in FIG. 9, the second lens 59 includes a substrate 591 and small lenses 592B and 592C. The small lenses 592B and 592C have a convex shape having a curvature different from the predetermined curvature and have a function of collimating an incident light beam. Further, the curvature of the small lenses 592B and 592C is set to be substantially the same.

The substrate 591 is formed to have a rectangular plate shape and the small lenses 592C and 592B are formed on a surface of the substrate 591 on the side in the direction opposite to the Z direction. In addition, in a region in which the small lenses 592B and 592C of the substrate 591 are not formed, transmission regions Ar1 and Ar2 are formed, and the transmission regions Ar1 and Ar2 have a function of transmitting an incident light beam.

As illustrated in FIGS. 2 and 4, the second lens 59 is disposed on the Z direction side from the reflective mirrors 57B and 57C in the direction parallel to the Z direction.

Here, the reflective mirrors 57A to 57D and the first lens 58 and the second lens 59 disposed in the optical path changing device 5 are fixed in, for example, the housing 50 which will be described below. The optical path changing device 5 will be described below in detail.

Configuration of Optical Path Changing Device

Figure 10:
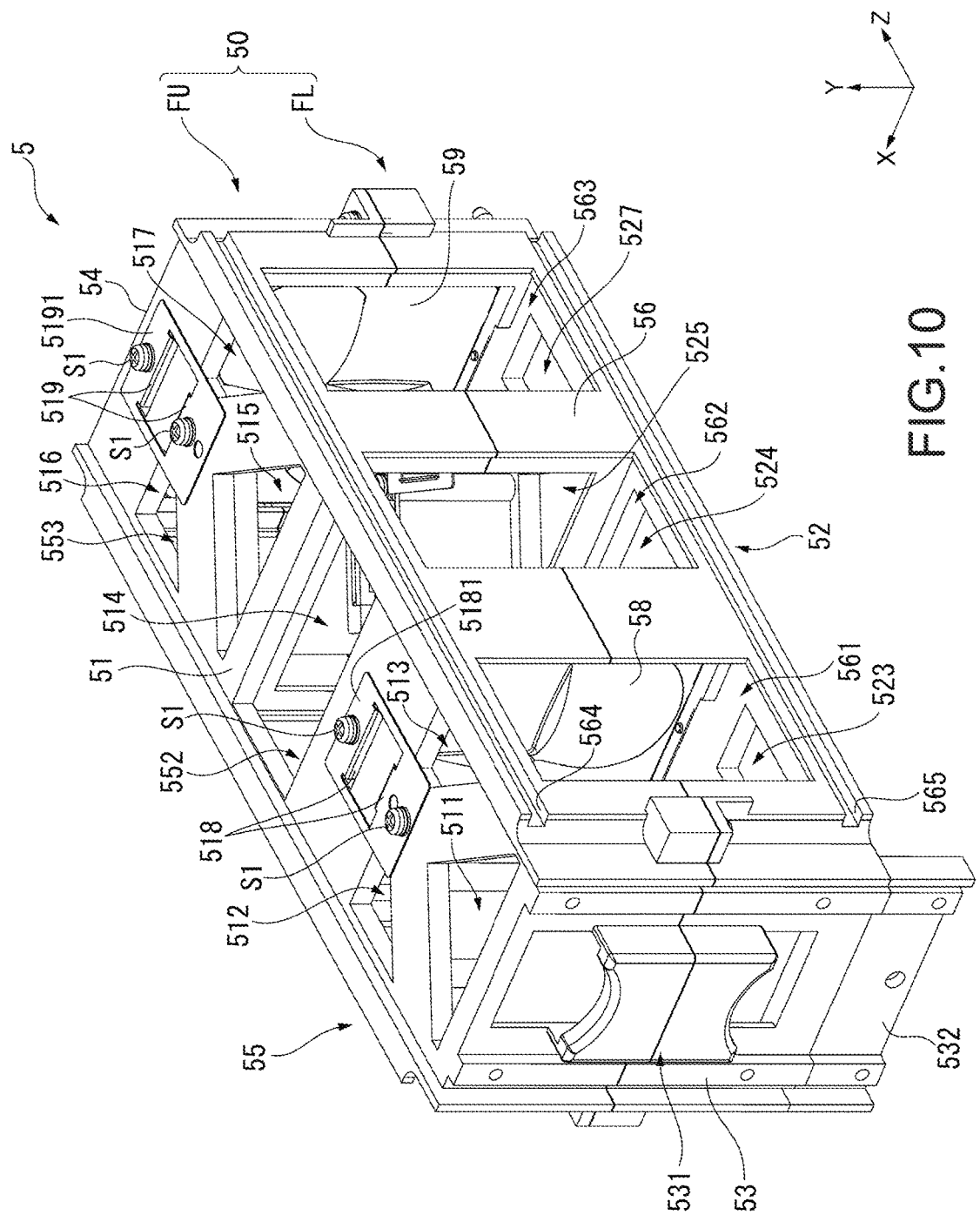
FIG. 10 is a perspective view illustrating an optical path changing device according to the embodiment when viewed from a side in a direction opposite to the emission direction of the light beam.
Figure 11:
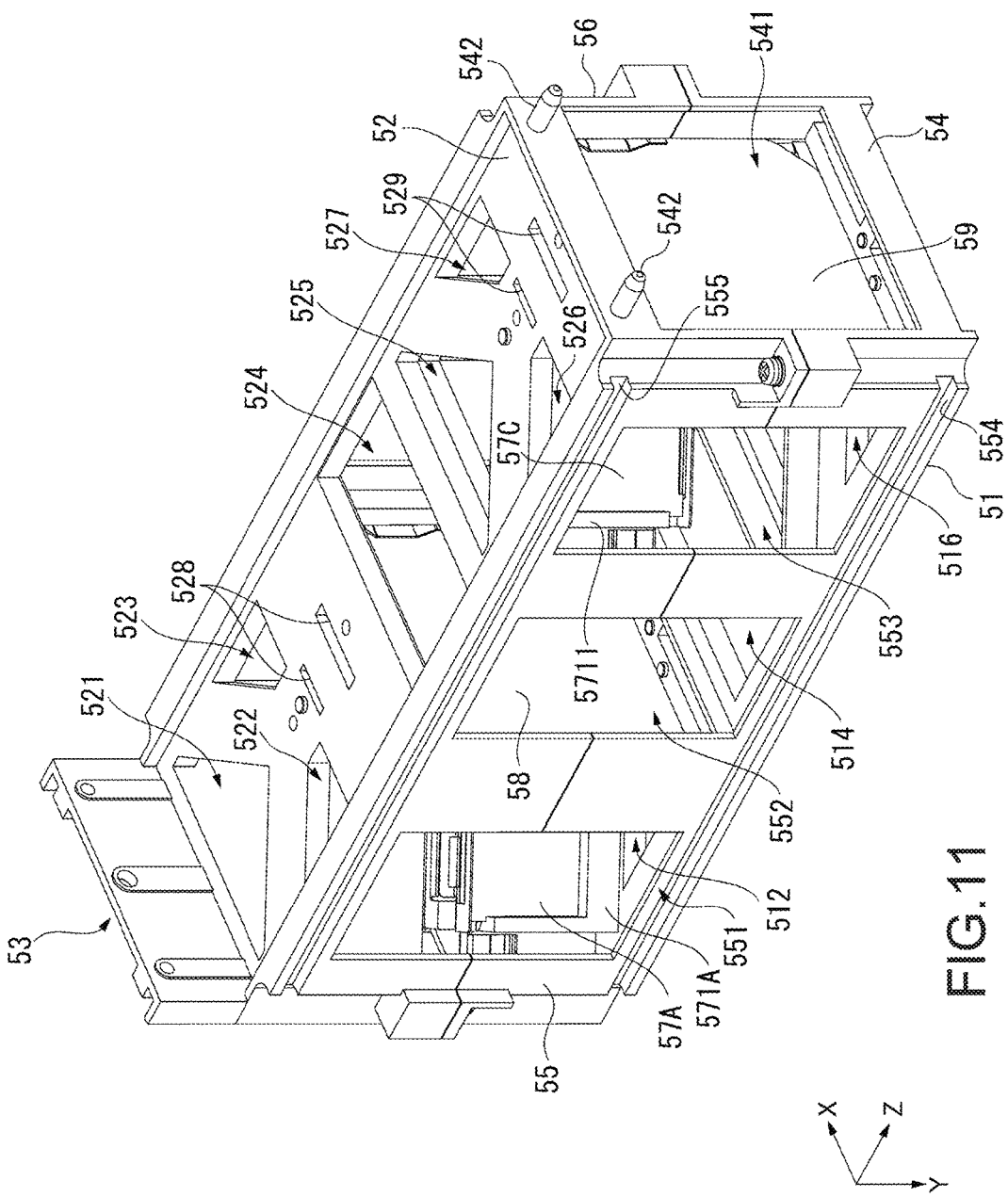
FIG. 11 is a perspective view illustrating a lower surface side of the optical path changing device according to the embodiment when viewed from the side in the emission direction of the light beam.
Figure 12:
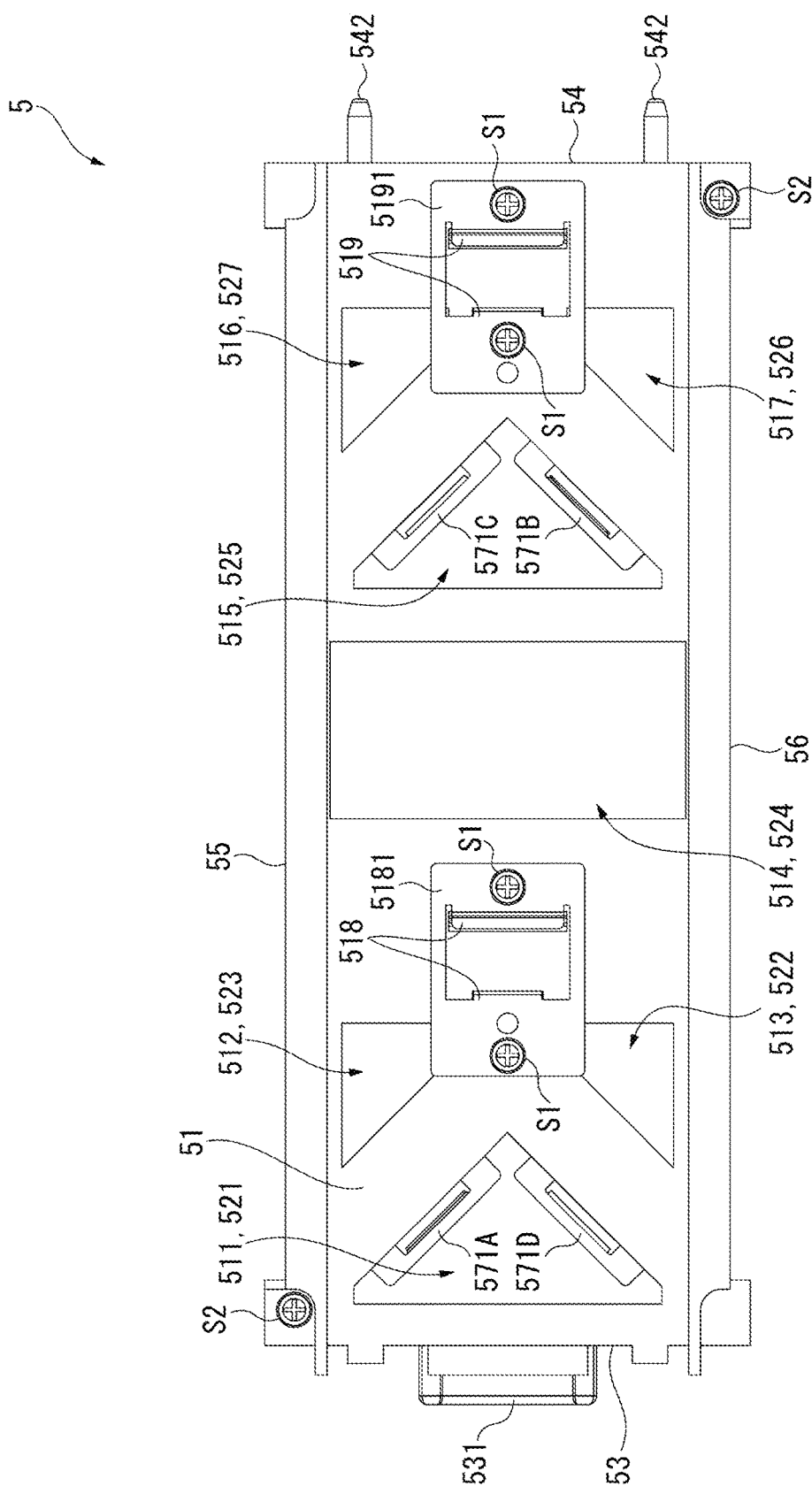
FIG. 12 is a plan view of an upper surface of the optical path changing device according to the embodiment.
Figure 13:
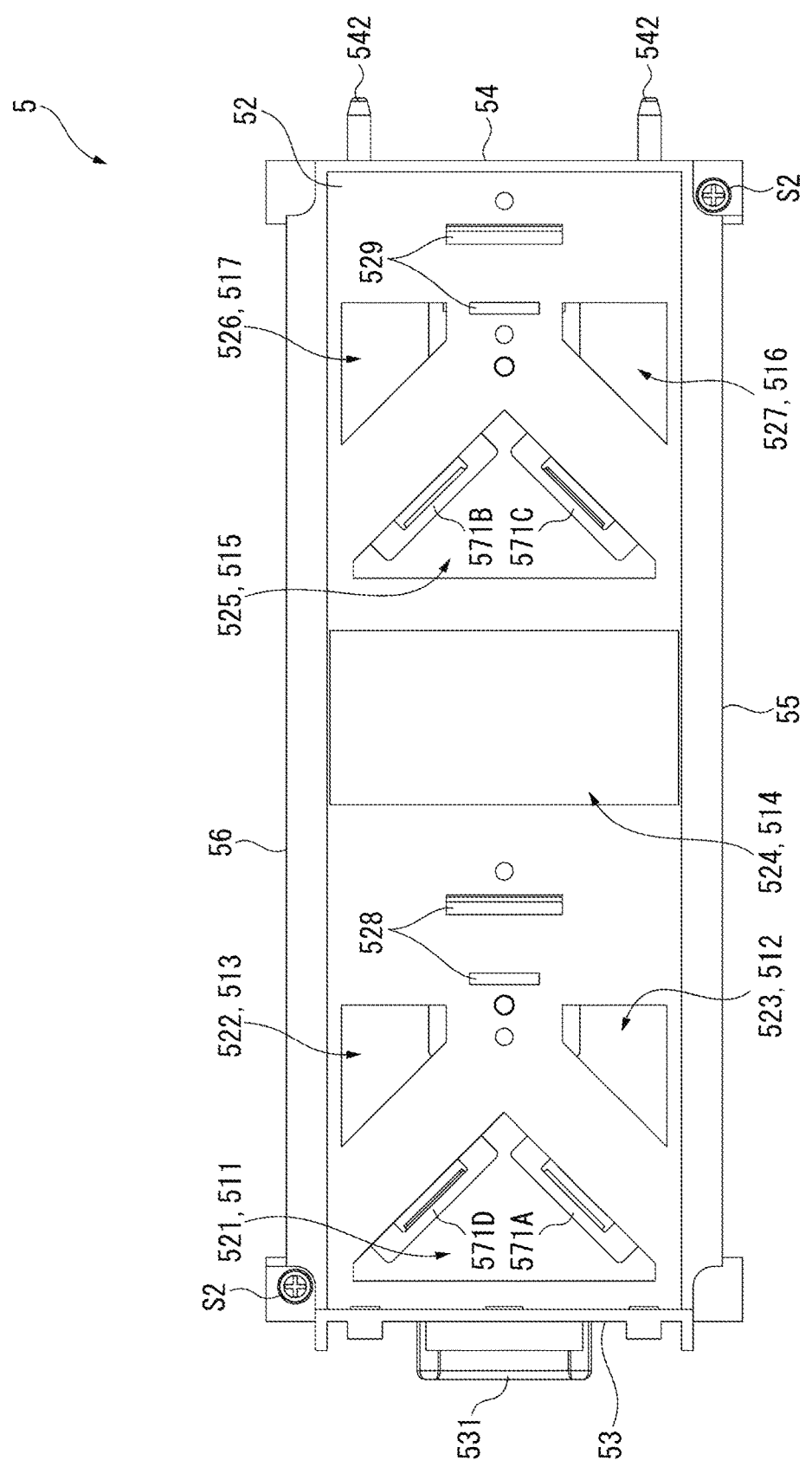
FIG. 13 is a plan view of a lower surface of the optical path changing device according to the embodiment.
Figure 14:
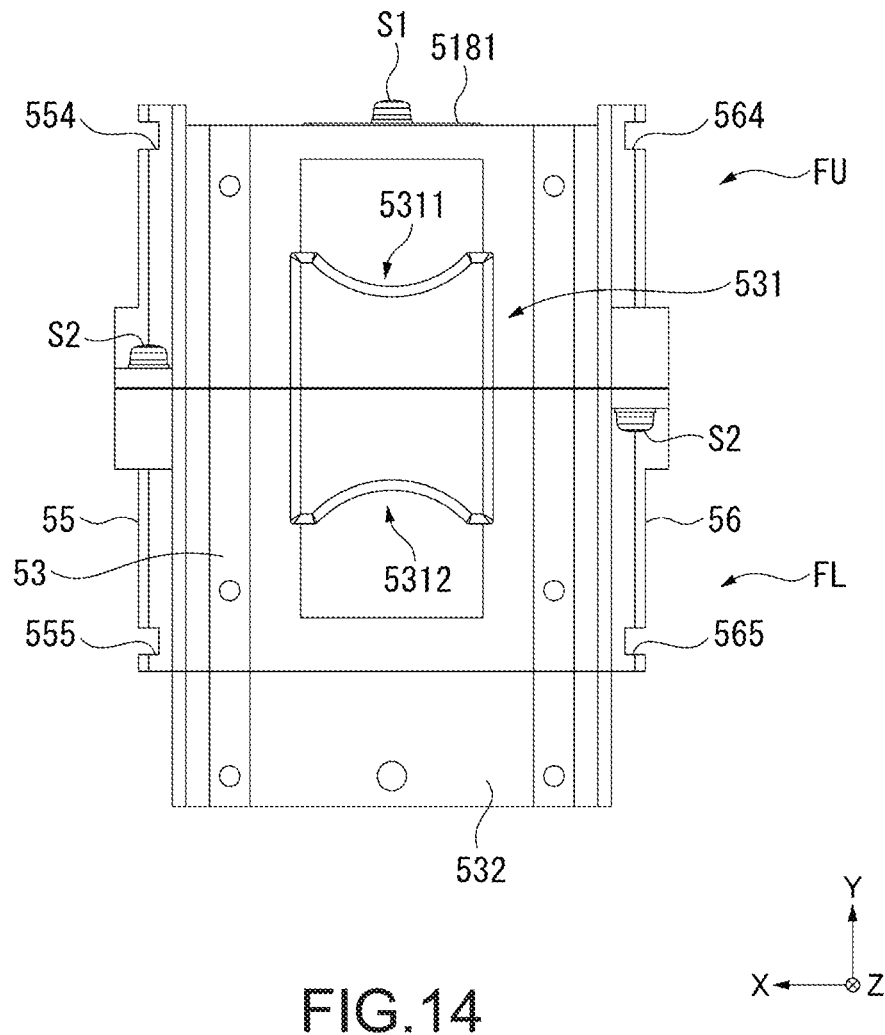
FIG. 14 is a front view illustrating the optical path changing device according to the embodiment when viewed from the side in a direction opposite to the emission direction of the light beam.

FIG. 10 is a perspective view illustrating an upper surface 51 side, which will be described below, of the optical path changing device 5 when viewed from the side in the direction opposite to the Z direction. FIG. 11 is a perspective view illustrating a lower surface 52 side, which will be described below, of the optical path changing device 5 when viewed from the side in the Z direction. FIG. 12 is a plan view of the optical path changing device 5 when viewed from the side in the Y direction. FIG. 13 is a plan view of the optical path changing device 5 when viewed from the side in the direction opposite to the Y direction. FIG. 14 is a front view illustrating the optical path changing device 5 when viewed from the side in the direction opposite to the Z direction.

As illustrated in FIGS. 10 to 14, the optical path changing device 5 includes the housing 50. The housing 50 is configured to include a first frame member FU and a second frame member FL which are molded by aluminum die casting, which will be described below in detail. The housing 50 is formed to have substantially a rectangular parallelepiped shape having the upper surface 51, the lower surface 52, a light shielding surface 53, an emitting surface 54, a first side surface 55, and a second side surface 56.

Further, the first frame member FU corresponds to a first member according to the invention and the second frame member FL corresponds to a second member according to the invention.

Configuration of Upper Surface and Lower Surface

As illustrated in FIGS. 10 to 14, on the upper surface 51, a plurality of openings 511 to 517 and grooves 518 and 519 are formed. In addition, on the lower surface 52, a plurality of openings 521 to 527 and grooves 528 and 529 are formed. Of the plurality of openings 511 to 517 and 521 to 527, the openings 511 and 521 are formed to have substantially a triangular shape on the outermost side in the direction opposite to the Z direction on the upper surface 51 and the lower surface 52, respectively. In addition, the openings 512 and 513 and the openings 522 and 523 face each other in the direction parallel to the X direction and are formed to have substantially a trapezoidal shape between the openings 511 and 521 and the grooves 518 and 528. Further, the rectangular openings 514 and 524 are formed on the Z direction side from the grooves 518 and 528, and the openings 515 and 525 having the same shape as the openings 511 and 521 are formed on the Z direction side from the openings 514 and 524. Furthermore, the openings 516 and 526 and the openings 517 and 527 having the same shape as the openings 512 and 522 and the openings 513 and 523 are formed on the Z direction side from the openings 515 and 525. Also, the grooves 519 and 529 having the same shape as the grooves 518 and 528 are formed at outermost positions on the Z direction side on the upper surface 51 and the lower surface 52.

Further, the upper surface 51 corresponds to a second surface according to the invention, and the lower surface 52 corresponds to a first surface according to the invention.

As illustrated in FIGS. 12 and 13, the openings 511 and 521 are formed at positions at which cooling can be performed on a surface of holding sections 571A and 571D on the side in the direction opposite to the Z direction, which holds the reflective mirrors 57A and 57D. Similarly, the openings 515 and 525 are formed at positions at which cooling can be performed on a surface of holding sections 571B and 571C on the side in the direction opposite to the Z direction, which holds the reflective mirrors 57B and 57C. A cooling gas supplied from the cooling device 9 is circulated from the openings 521 and 525 toward the openings 511 and 515, which will be described below in detail. In this manner, the holding sections 571A to 571D are cooled with the cooling gas.

Further, the holding sections 571A to 571D correspond to reflective member holding sections according to the invention.

In addition, as illustrated in FIGS. 10 and 12, leaf spring members 5181 and 5191 are fixed to the grooves 518 and 519 on the upper surface 51, respectively, by screws S1. The leaf spring members 5181 and 5191 have projecting portions (not illustrated) which are inserted into the grooves 518 and 519, and are fixed to the upper surface 51 by the screws S1 in a state in which the projecting portions are inserted into the grooves 518 and 519. The projecting portions inserted into the grooves 518 and 519 have a function of pinching the first lens 58 and the second lens 59. In other words, the leaf spring members 5181 and 5191 have a function of holding the first and second lenses 58 and 59 on the upper surface 51 side, that is, on the Y direction side. Further, the leaf spring members 5181 and 5191 correspond to first bias members according to the invention.

Configuration of Light Shielding Surface

The light shielding surface 53 has a function of reducing leakage of the emitted light beam emitted from the light source devices 41A to 41D toward the first and second side surfaces 55 and 56 of the optical path changing device 5, in the direction opposite to the Z direction. Therefore, as illustrated in FIG. 14, no opening is formed in the light shielding surface 53, unlike the upper surface 51, the lower surface 52, the emitting surface 54, the first and second side surfaces 55 and 56. In addition, the light shielding surface 53 includes a grip section 531 and an extending section 532. As illustrated in FIGS. 10 and 14, the grip section 531 is formed substantially at the central portion of the light shielding surface 53. The grip section 531 has recessed portions 5311 and 5312 that are recessed to the side in the direction opposite to the Y direction and to the side in the Y direction at an end portion of the grip section on the side in the Y direction and at the other end portion thereof on the side in the direction opposite to the Y direction, respectively.

Figure 17:
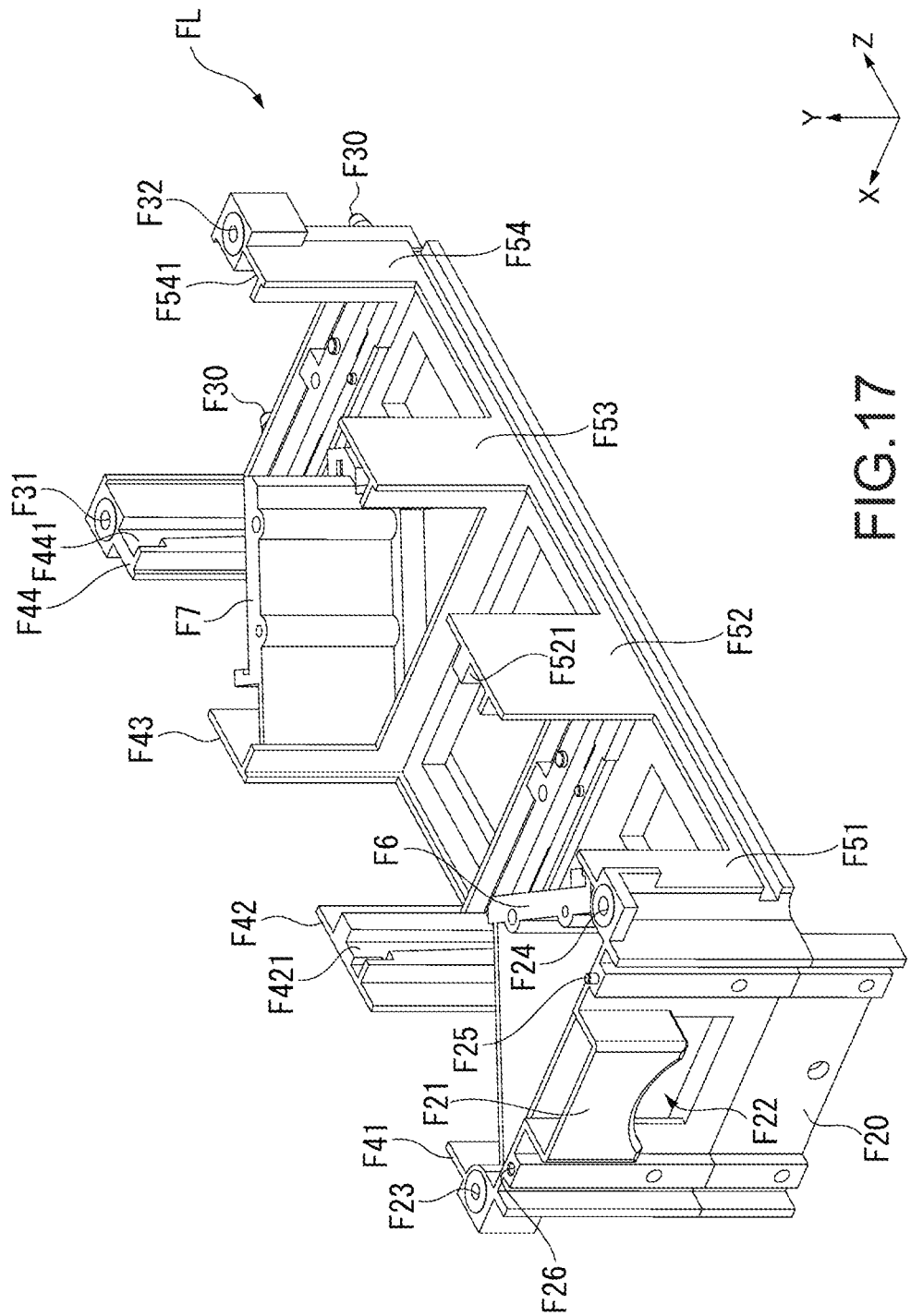
FIG. 17 is a perspective view illustrating a second frame member according to the embodiment when viewed from the side in a direction opposite to the emission direction of the light beam.

In addition, the extending section 532 is configured of a rectangular extending member F20 connected to an end portion of the second frame member FL on the side in the direction opposite to the Y direction, of the first frame member FU and the second frame member FL constituting the light shielding surface 53 (refer to FIG. 17).

Configuration of Emitting Surface

The emitting surface 54 has a function of emitting a light beam of which a direction is aligned by the optical path changing device 5, toward the uniformizing device 32 positioned in the Z direction. Therefore, as illustrated in FIG. 11, a rectangular opening 541 is formed substantially at the central portion of the emitting surface 54. The opening 541 is formed to have substantially the same size as a region including the small lenses 592B and 592C and the transmission regions Ar1 and Ar2 in the substrate 591 of the second lens 59. In addition, two protrusions 542 that protrude in the Z direction are formed at an end portion of the emitting surface 54 on the Y direction side. The protrusions 542 are connected to the base member 36 when the optical path changing device 5 is mounted in the projector 1.

Configuration of Side Surface

As illustrated in FIG. 11, three openings 551, 552, and 553 and guide rails 554 and 555 are formed on the first side surface 55. The three openings 551 to 553 are formed to have rectangular shapes, respectively, and, as illustrated in FIG. 4, the opening 551 is formed at a position facing the light source device 41A. In this manner, the emitted light beam L11 emitted from the light source device 41A is incident to the optical path changing device 5 through the opening 551. In addition, the opening 553 is formed at a position facing the light source device 41C, and the emitted light beam L31 emitted from the light source device 41C is incident to the optical path changing device 5 through the opening 551. Further, the opening 552 is formed between the opening 551 and the opening 553.

As illustrated in FIGS. 11 and 14, the guide rails 554 and 555 are formed on the Y direction side and on the side in the direction opposite to the Y direction with the openings 551 to 553 interposed therebetween. Specifically, the guide rail 554 is formed along an edge portion of the first side surface 55 on the Y direction side and the guide rail 555 is formed along an edge portion of the first side surface 55 on the side in the direction opposite to the Y direction. The guide rails 554 and 555 are engaged with engagement portions 3621 and 3622 of the base member 36 (refer to FIG. 20).

As illustrated in FIG. 10, three openings 561, 562, and 563 and guide rails 564 and 565 are formed on the second side surface 56. The three openings 561 to 563 are formed to have rectangular shapes, respectively, and, as illustrated in FIG. 4, the opening 561 is formed at a position facing the light source device 41D. In this manner, the emitted light beam L41 emitted from the light source device 41D is incident to the optical path changing device 5 through the opening 561. In addition, the opening 563 is formed at a position facing the light source device 41B, and the emitted light beam L21 emitted from the light source device 41B is incident to the optical path changing device 5 through the opening 561. Further, the opening 562 is formed between the opening 561 and the opening 563. The openings 551 to 553 and the openings 561 to 563 are formed to have substantially the same shapes, respectively.

As illustrated in FIGS. 10 and 14, the guide rails 564 and 565 are formed on the Y direction side and on the side in the direction opposite to the Y direction with the openings 561 to 563 interposed therebetween. Specifically, the guide rail 564 is formed along an edge portion of the second side surface 56 on the Y direction side and the guide rail 565 is formed along an edge portion of the second side surface 56 on the side in the direction opposite to the Y direction. The guide rails 564 and 565 are engaged with engagement portions 3631 and 3632 of the base member 36 (refer to FIG. 20).

Configuration of Frame Member

Figure 15:
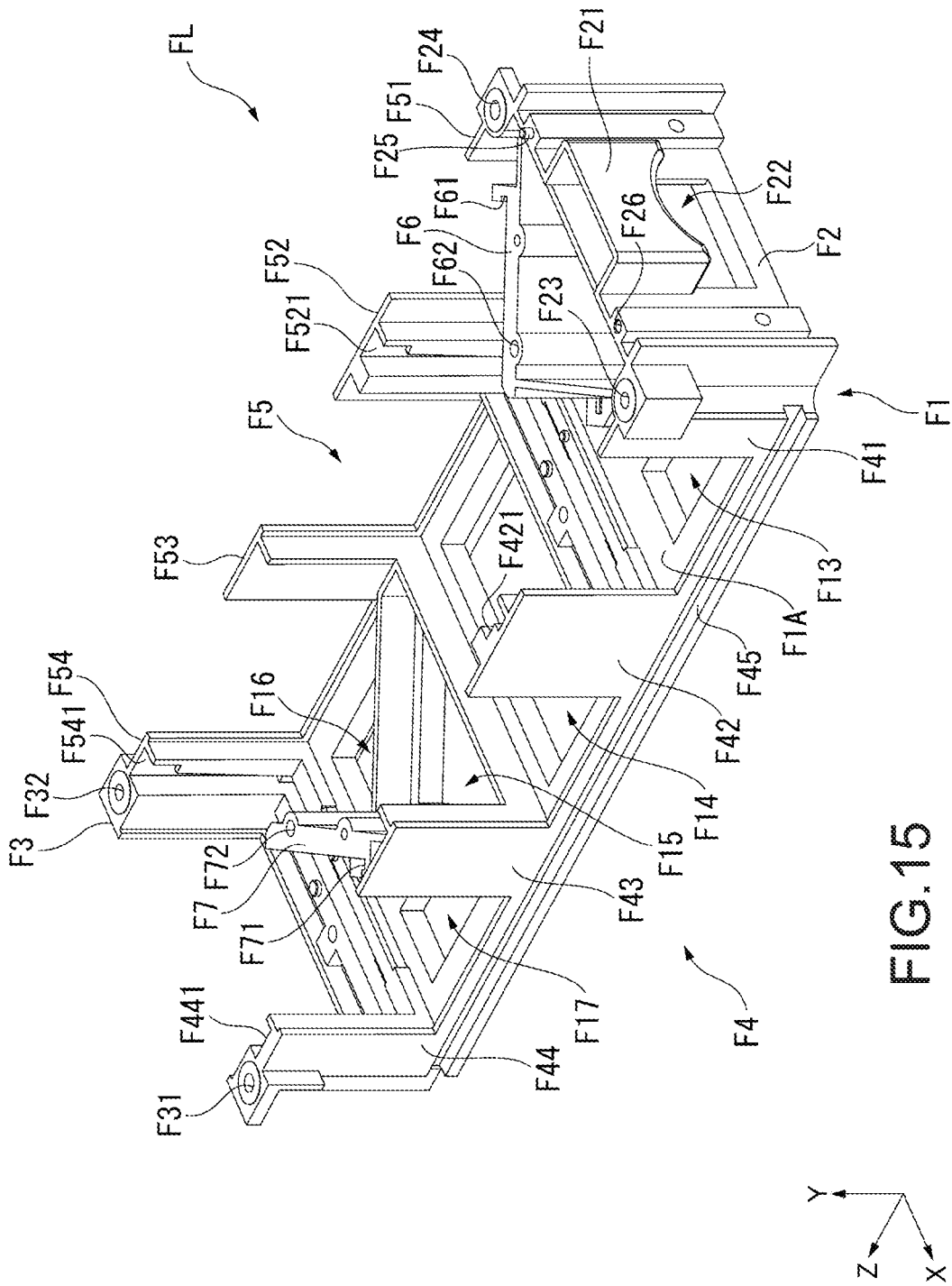
FIG. 15 is a perspective view illustrating a frame member constituting the housing according to the embodiment when viewed from the side in a direction opposite to the emission direction of the light beam.
Figure 16:
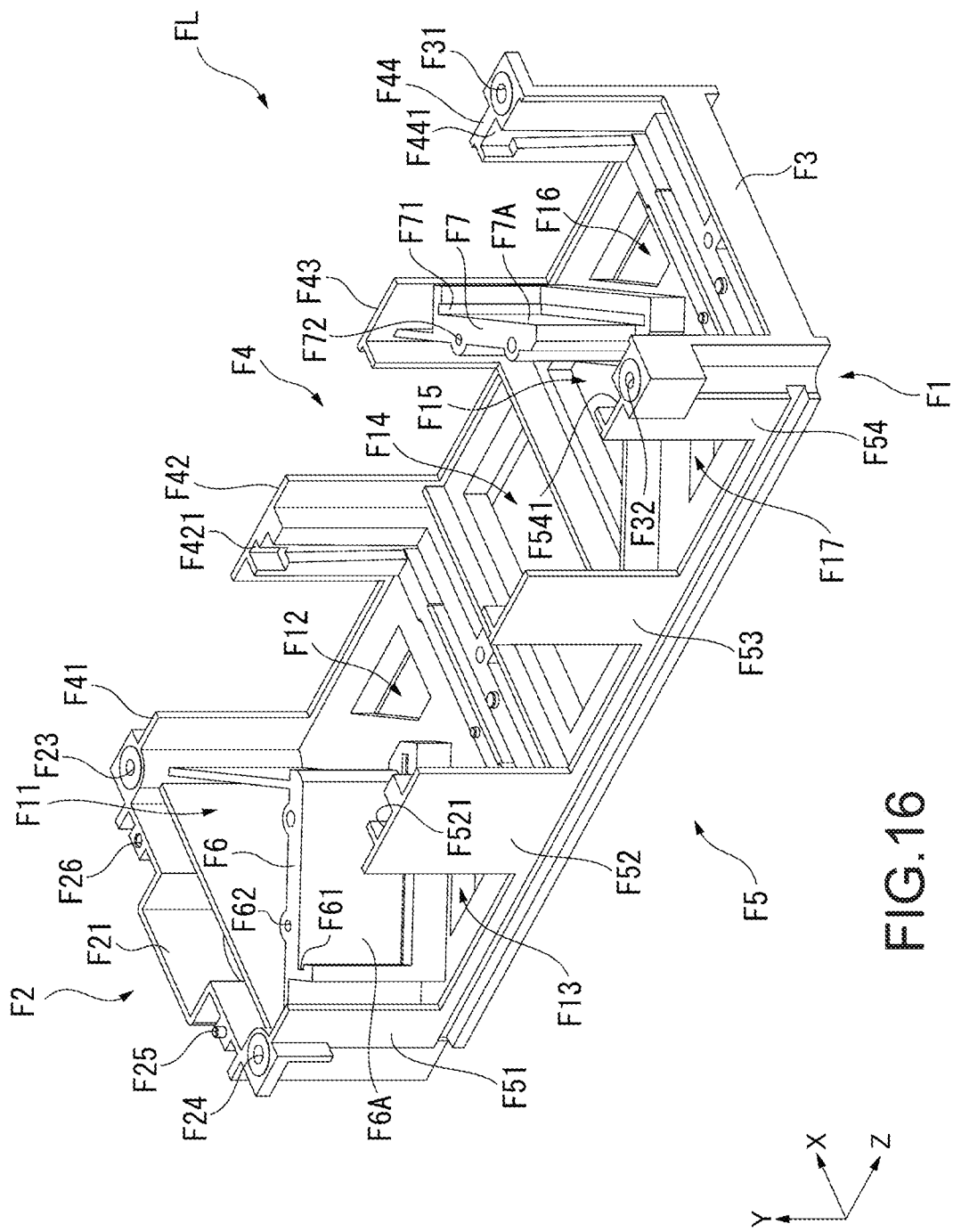
FIG. 16 is a perspective view illustrating a frame member according to the embodiment when viewed from the side in the emission direction of the light beam.

FIG. 15 is a perspective view illustrating a frame member F constituting the housing 50 when viewed from the side in the direction opposite to the Z direction. FIG. 16 is a perspective view illustrating the frame member F when viewed from the Z direction side.

As illustrated in FIG. 10, the housing 50 of the optical path changing device 5 is configured to include the two frame members FU and FL. Of the two frame members FU and FL, a frame member that is disposed on the Y direction side and configures the upper surface 51 of the housing 50 is the first frame member FU and a frame member that configures the lower surface 52 is the second frame member FL. The first frame member FU and the second frame member FL are aluminum die casting products having substantially the same shape, by injection molding using the same die. In other words, the dimension of the first frame member FU and the second frame member FL in the Y direction is substantially the same. Therefore, in the following description, only the second frame member FL will be described and the description of the first frame member FU will be omitted.

As illustrated in FIGS. 15 and 16, the second frame member FL includes a lower surface constituting section F1, a light shielding surface constituting section F2, an emitting surface constituting section F3, a first side surface constituting section F4, and a second side surface constituting section F5. Of the sections, one of the upper surface 51 and the lower surface 52 of the housing 50 is constituted with the lower surface constituting section F1. The lower surface constituting section F1 has openings F11 to F17 corresponding to the plurality of openings 511 to 517 and 521 to 527 of the housing 50, respectively, and mirror fixing sections F6 and F7 that extend in the Y direction from an inner surface F1A are formed on the inner surface F1A on the side in the direction opposite to the Y direction. The mirror fixing sections F6 and F7 have a function of fixing the reflective mirrors 57A to 57D. The mirror fixing section F6 is formed between the opening F11 and the opening F13 of the inner surface F1A and the mirror fixing section F7 is formed between the opening F15 and the opening F16 of the inner surface F1A.

The mirror fixing sections F6 and F7 include mirror fixing reference surfaces F6A and F7A set at an angle at which the emitted light beams emitted from the light source devices 41A to 41D, respectively, are reflected toward the Z direction. Specifically, the mirror fixing reference surface F6A of the mirror fixing section F6 is formed on the opening F13 side. Similarly, the mirror fixing reference surface F7A of the mirror fixing section F7 is formed on the opening F16 side. In addition, the mirror fixing sections F6 and F7 include substantially L-shaped grooves F61 and F71 formed along the mirror fixing reference surfaces F6A and F7A. Further, two holes F62 and F72 are formed at end portions of the mirror fixing sections F6 and F7 on the Y direction side. In this manner, the reflective mirrors 57A to 57D are fitted to the grooves F61 and F71 of the mirror fixing sections F6 and F7, respectively, and are screwed and fixed through the holes F62 and F72 (refer to FIG. 18).

Further, the mirror fixing sections F6 and F7 constitute a part of the holding sections 571A to 571D of the housing 50. In addition, the mirror fixing sections F6 and F7 are molded by the aluminum die casting. Therefore, when the temperatures of the reflective mirrors 57A to 57D are increased by the emitted light beams L11 to L41, the heat of the reflective mirrors 57A to 57D is transmitted to the mirror fixing sections F6 and F7.

The light shielding surface constituting section F2 constitutes a part of the light shielding surface 53 of the housing 50. The light shielding surface constituting section F2 includes a grip member F21, a recessed portion F22, holes F23 and F24, a protrusion F25 and a recessed portion F26. The grip member F21 corresponds to a part of the grip section 531. The grip member F21 is provided substantially at the central portion of the light shielding surface constituting section F2 and has a shape of extending to the end portion on the Y direction side. In addition, the recessed portion F22 is formed at an end portion of the grip member F21 on the side in the direction opposite to the Y direction. The recessed portion F22 corresponds to the recessed portions 5311 and 5312 of the housing 50. Further, the holes F23 and F24 are formed on both sides of the light shielding surface constituting section F2. Furthermore, the protrusion F25 and the recessed portion F26 are disposed at the end portions of the light shielding surface constituting section F2 on the Y direction side, at positions facing each other with the grip member F21 interposed therebetween. The protrusion F25 is formed to have a shape so as to be fitted into the recessed portion F26. Therefore, when the first frame member FU is disposed to be stacked on the second frame member FL, the protrusion F25 of the first frame member FU is fitted into the recessed portion F26 of the second frame member FL and the protrusion F25 of the second frame member FL is fitted into the recessed portion F26 of the first frame member FU. In other words, the protrusion F25 and the recessed portion F26 have a function of a positioning member.

The emitting surface constituting section F3 constitutes a part of the emitting surface 54 of the housing 50. The emitting surface constituting section F3 is formed to have a substantial U shape and holes F31 and F32 are formed on both side portions of the emitting surface constituting section F3. Specifically, when the first frame member FU is disposed to be stacked on the second frame member FL, the holes F31 and F32 of the first frame member FU are overlapped with the holes F31 and F32 of the second frame member FL and screws S2 are screwed in the holes F31 and F32, thereby firmly fixing the first frame member FU and the second frame member FL (refer to FIGS. 12 and 13).

The first side surface constituting section F4 includes a plurality of upright portions F41, F42, F43, F44, and a guide rail F45. The upright portions F41 to F44 are formed to have rectangular shapes extending toward the Y direction from the end portion of the lower surface constituting section F1 on the X direction side. Of the upright portions, the upright portion F41 is positioned on the outermost side in the direction opposite to the Z direction and is connected to the light shielding surface constituting section F2. In addition, the upright portion F42 is positioned on the Z direction side from the upright portion F41 and the upright portion F43 is positioned on the Z direction side from the upright portion F42. Further, the upright portion F44 is positioned on the outermost side in the Z direction and is connected to the emitting surface constituting section F3. The guide rail F45 is formed on the side in the direction opposite to the Y direction from the upright portions F41 to F44 on the side of the first side surface constituting section F4 in the direction opposite to the Y direction and is configured of a groove extending in the direction parallel to the Z direction. Grooves F421 and F441 extending in the Y direction are formed on the inner side surface of the upright portions F42 and F44. The first lens 58 and the second lens 59 are fitted in the grooves F421 and F441, respectively.

Further, the guide rail F45 corresponds to guide rails 554 and 565 of the housing 50.

The second side surface constituting section F5 includes a plurality of upright portions F51, F52, F53, F54, and a guide rail F55. The upright portions F51 to F54 are formed to have rectangular shapes extending toward the Y direction from the end portion of the lower surface constituting section F1 on the side in the direction opposite to the X direction. Of the upright portions, the upright portion F51 is positioned on the outermost side in the direction opposite to the Z direction and is connected to the light shielding surface constituting section F2. In addition, the upright portion F52 is positioned on the Z direction side from the upright portion F51 and the upright portion F53 is positioned on the Z direction side from the upright portion F52. Further, the upright portion F54 is positioned on the outermost side in the Z direction and is connected to the emitting surface constituting section F3. The guide rail F55 is formed on the side in the direction opposite to the Y direction from the upright portions F51 to F54 on the side of the second side surface constituting section F5 in the direction opposite to the Y direction and is configured of a groove extending in the direction parallel to the Z direction. Grooves F521 and F541 extending in the Y direction are formed on the inner side surface of the upright portions F52 and F54. The first lens 58 and the second lens 59 are fitted in the grooves F521 and F541, respectively. Further, the guide rail F55 corresponds to guide rails 555 and 564 of the housing 50.

Assembling Method of Optical Path Changing Device

Figure 18:
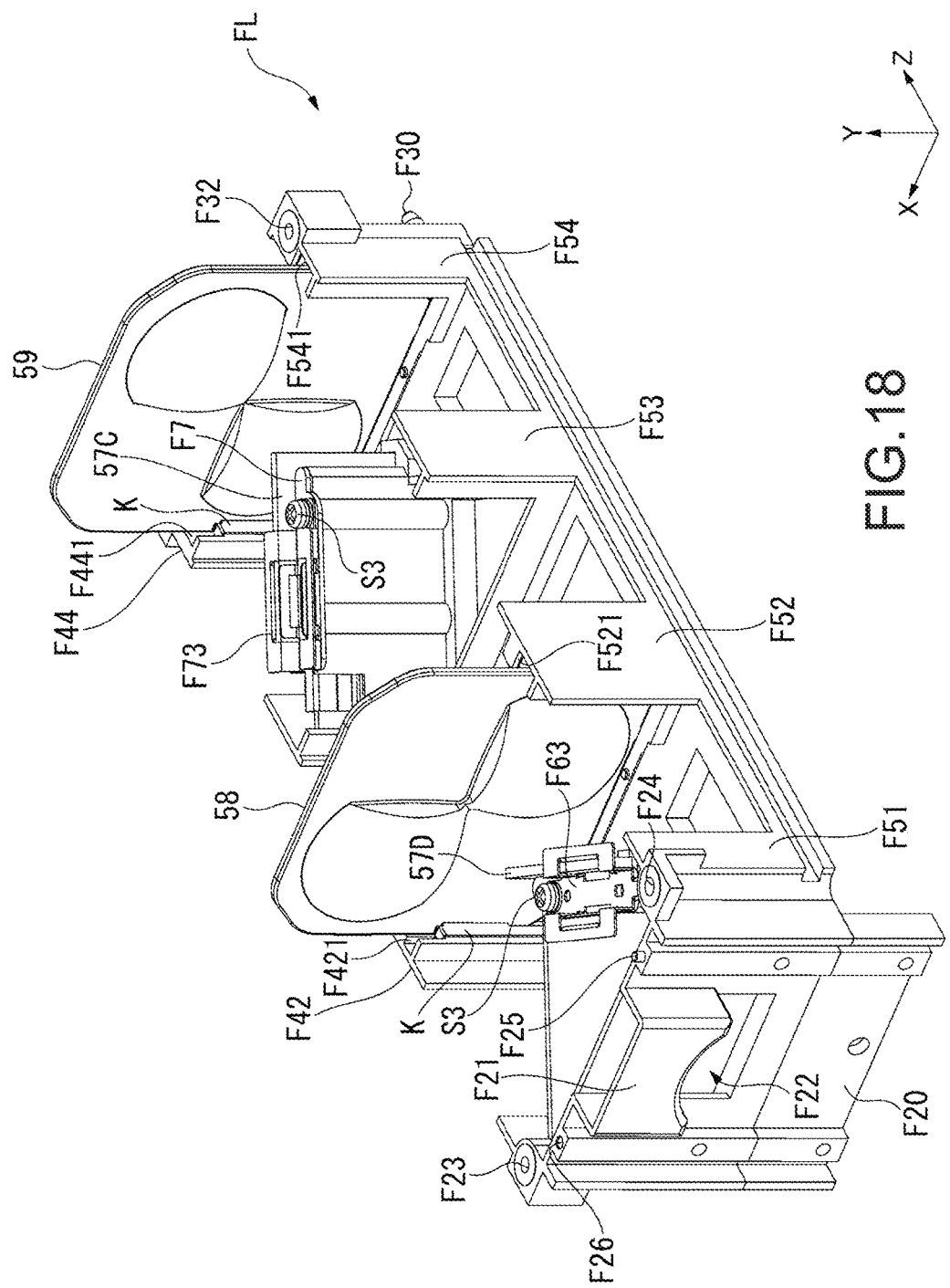
FIG. 18 is a perspective view illustrating the second frame member when viewed from the side in a direction opposite to the emission direction of the light beam, in a state in which the reflective mirrors, the first lens, and the second lens according to the embodiment are mounted.
Figure 19:
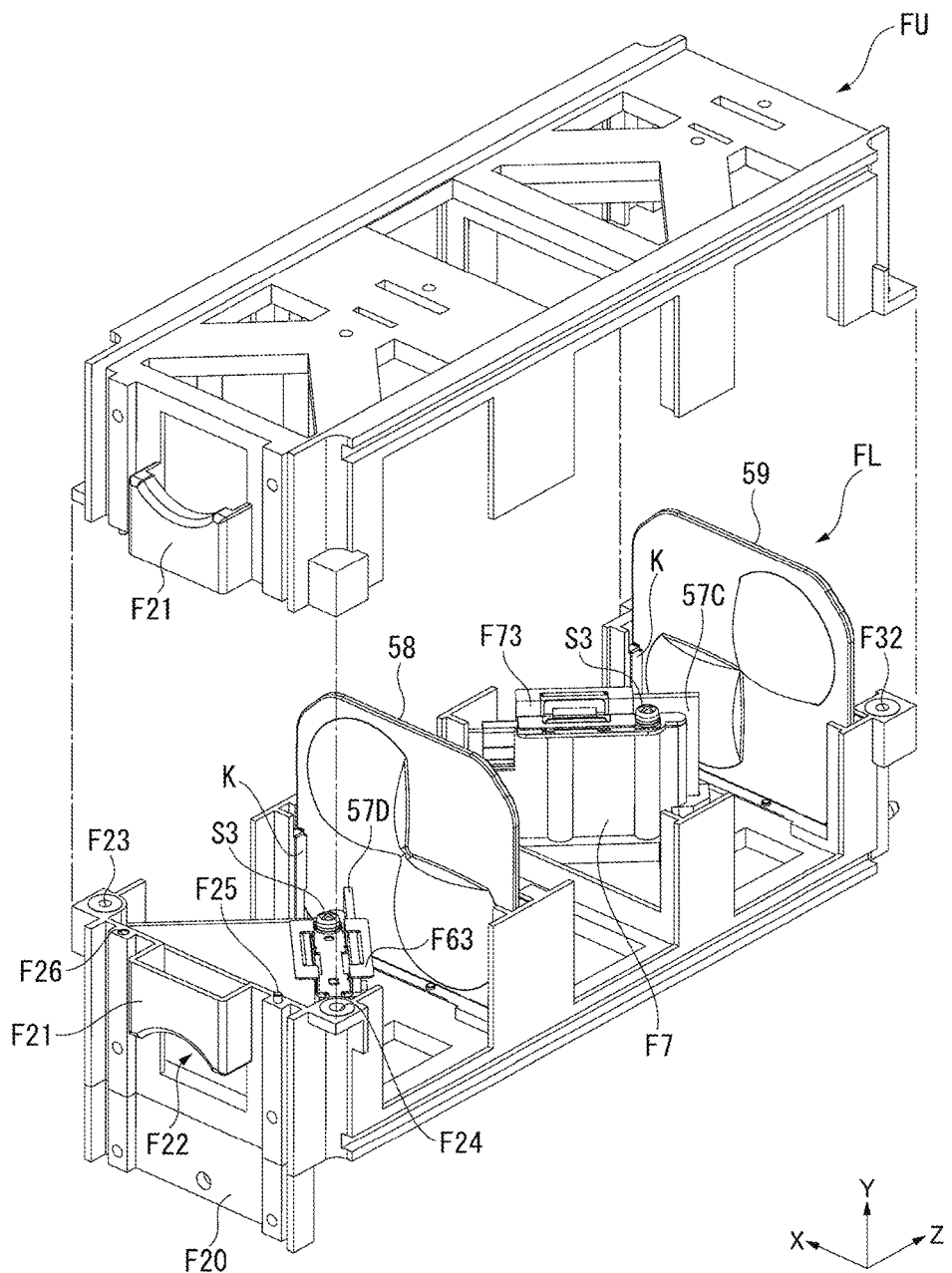
FIG. 19 is a partially exploded perspective view illustrating the optical path changing device according to the embodiment when viewed from the side in a direction opposite to the emission direction of the light beam.

FIG. 17 is a perspective view illustrating the second frame member FL when viewed from the side in the direction opposite to the Z direction. FIG. 18 is a perspective view illustrating the second frame member FL when viewed from the side in the direction opposite to the Z direction, in a state in which the reflective mirrors 57C and 57D, the first lens 58, and the second lens 59 are mounted. FIG. 19 is a partially exploded perspective view illustrating the optical path changing device 5 when viewed from the side in the direction opposite to the Z direction. Further, in FIG. 19, the mirror fixing portions F6 and F7 are omitted in the first frame member FU.

First, as illustrated in FIG. 17, an operator mounts an extending member F20 in the light shielding surface constituting section F2 of the second frame member FL which is in the state illustrated in FIGS. 15 and 16. In addition, the operator mounts a protrusion F30 to the emitting surface constituting section F3. Further, the extending member F20 constitutes a part of the light shielding surface 53 of the housing 50 and the protrusion F30 constitutes the protrusion 542 of the housing 50.

Then, as illustrated in FIG. 18, the operator fits the reflective mirrors 57C and 57D in the grooves F61 and F71 along the mirror fixing reference surfaces F6A and F7A of the mirror fixing sections F6 and F7. Then, the reflective mirrors 57C and 57D are covered by the fixing members F63 and F73 and the screws S3 are screwed in the holes F62 and F72. In this manner, the reflective mirrors 57C and 57D are screwed and fixed to the mirror fixing sections F6 and F7 through the holes F62 and F72.

Further, the operator performs the same operations also on the first frame member FU, which is not illustrated. Specifically, the operator fits the reflective mirrors 57A and 57B in the grooves F61 and F71 along the mirror fixing reference surfaces F6A and F7A of the mirror fixing sections F6 and F7 of the first frame member FU. Then, the reflective mirrors 57A and 57B are covered by the fixing members F63 and F73 and the screws S3 are screwed in the holes F62 and F72. In this manner, the reflective mirrors 57A and 57B are screwed and fixed to the mirror fixing sections F6 and F7 through the holes F62 and F72.

Back to FIG. 18, the operator fits the first lens 58 in the grooves F421 and F521 formed in the upright portions F42 and F52 of the second frame member FL to which the reflective mirrors 57C and 57D are fixed. Then, the operator fits the leaf spring member K between the grooves F421 and F521 and the first lens 58. Similarly, the operator fits the second lens 59 in the grooves F441 and F541 formed in the upright portions F44 and F54. Then, the operator fits the leaf spring member K between the grooves F441 and F541 and the second lens 59. In this manner, the first lens 58 and the second lens 59 are fixed to the second frame member FL.

Further, the grooves F421, F441, F521, and F541 correspond to optical conversion component holding sections according to the invention and the leaf spring member K corresponds to a second bias member according to the invention.

Then, as illustrated in FIG. 19, the operator stacks the first frame member FU on the second frame member FL. At this time, the protrusion F25 formed in the light shielding surface constituting section F2 of the first frame member FU and the second frame member FL is positioned to be fit in the recessed portion F26, and the first frame member FU is stacked on the second frame member FL. Then, the operator screws the screws S2 into the holes F23, F24, F31, and F32. In this manner, the first frame member FU and the second frame member FL are fixed and constitute the housing 50. In this manner, the optical path changing device 5 is configured.

Attachment Structure of Optical Path Changing Device

Figure 20:
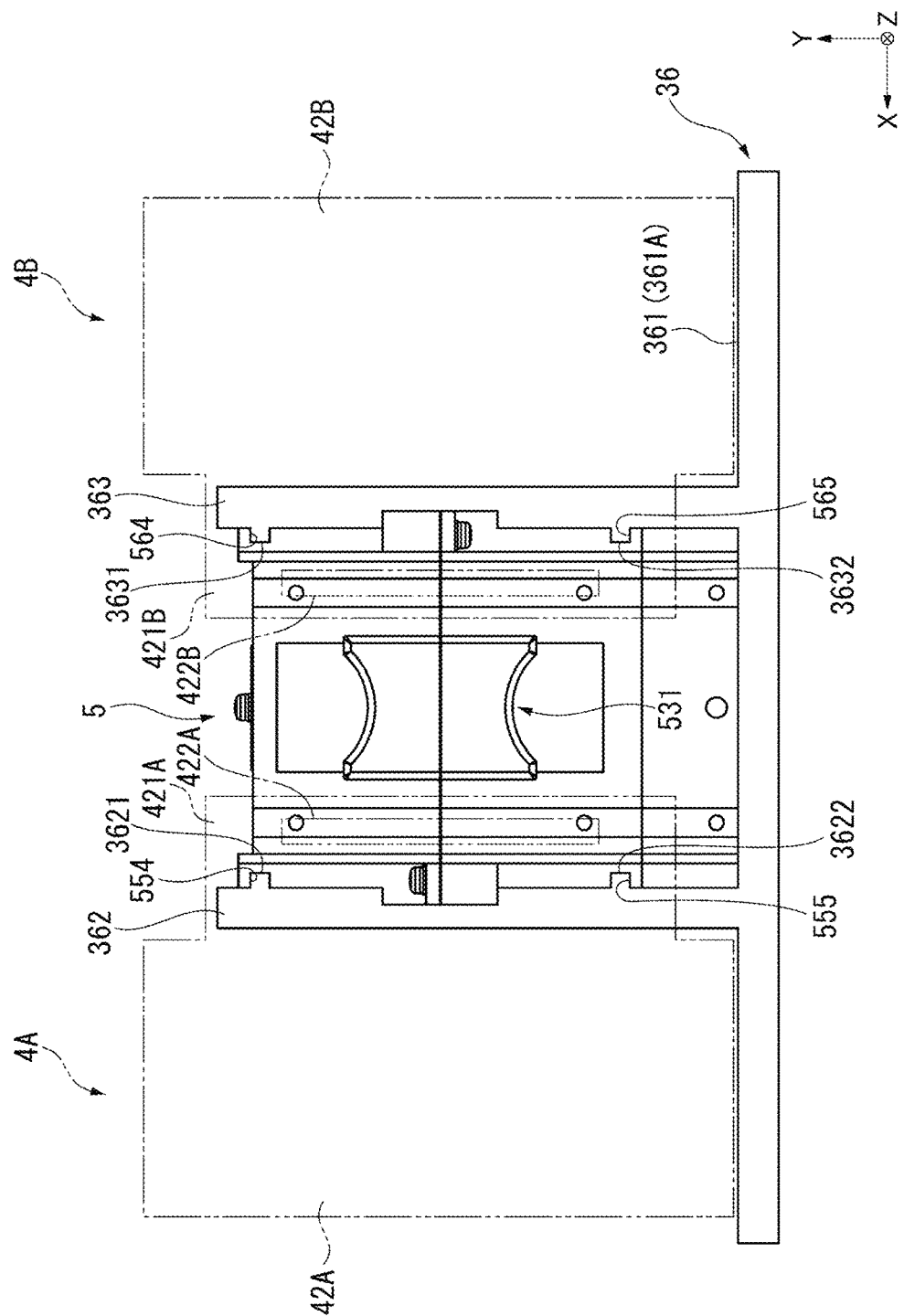
FIG. 20 is a plan view illustrating a first lamp unit, a second lamp unit, and the optical path changing device fixed to a base member of the projector according to the embodiment.

FIG. 20 is a plan view illustrating the first lamp unit 4A, the second lamp unit 4B, and the optical path changing device 5 fixed to the base member 36 of the projector 1.

As illustrated in FIG. 20, the optical path changing device 5 is mounted on the base member 36 of the projector 1. The base member 36 includes a bottom surface 361 and extending sections 362 and 363. The bottom surface 361 is fixed to the bottom surface 22 of the projector 1. The plate-shaped extending sections 362 and 363 extending to the Y direction side are fixed to the bottom surface 361. The extending section 362 has two engagement portions 3621 and 3622 protruding from a surface 362A of the extending section 362 on the side in the direction opposite to the X direction toward the side in the direction opposite to the X direction. The engagement portion 3621 is engaged with the guide rail 554 of the optical path changing device 5 and the engagement portion 3622 is engaged with the guide rail 555 of the optical path changing device 5. In comparison, the extending section 363 has two engagement portions 3631 and 3632 protruding from a surface 363A of the extending section 363 on the X direction side toward the X direction side. The engagement portion 3631 is engaged with the guide rail 564 of the optical path changing device 5 and the engagement portion 3632 is engaged with the guide rail 565 of the optical path changing device 5.

As illustrated in FIG. 20, the first lamp unit 4A includes an extending section 421A extending from a rectangular surface 42A on the side in the direction opposite to the Z direction toward the side opposite to the X direction. The extending section 421A is fixed to be stacked on a part of the optical path changing device 5 when the first lamp unit 4A is fixed to the base member 36. In addition, the second lamp unit 4B includes an extending section 421B extending from a rectangular surface 42B on the side in the direction opposite to the Z direction toward the X direction side. The extending section 421B is fixed to be stacked on a part of the optical path changing device 5 when the second lamp unit 4B is fixed to the base member 36. In other words, the first lamp unit 4A and the second lamp unit 4B are fixed by the extending sections such that the extending sections 421A and 421B cover the end portion of the optical path changing device 5 on the X direction side and the end portion thereof on the side in the direction opposite to the X direction.

In addition, the first lamp unit 4A includes a grip section 422A protruding from the extending section 421A to the side in the direction opposite to the Z direction. Further, the second lamp unit 4B includes a grip section 422B protruding from the extending section 421B to the side in the direction opposite to the Z direction. The grip sections 422A and 422B are formed to have a substantial U shape.

According to such a configuration, the operator grips the grip section 531 of the optical path changing device 5, engages the guide rails 554, 555, 564, and 565 with the engagement portions 3621, 3622, 3631, and 3632, and pushes the device in the Z direction, thereby, fixing the optical path changing device 5 to the base member 36. Then, the operator grips the grip sections 422A and 422B of the first lamp unit 4A and the second lamp unit 4B, and pushes the optical path changing device 5 in the Z direction so as to be interposed therebetween, thereby fixing the first lamp unit 4A and the second lamp unit 4B to the base member 36. In other words, the illuminating device 31 is fixed in the projector 1.

In a case where the first lamp unit 4A, the second lamp unit 4B, and the optical path changing device 5 are removed from the projector 1 for maintenance or the like, the grip sections 422A and 422B of the first lamp unit 4A and the second lamp unit 4B are gripped and are pulled to the side in the direction opposite to the Z direction, thereby removing the first lamp unit 4A and the second lamp unit 4B from the projector 1. Then, the grip section 531 of the optical path changing device 5 is pulled to the side in the direction opposite to the Z direction, thereby making it possible to remove the optical path changing device 5 from the projector 1. Further, movement of the optical path changing device 5 is regulated by the extending sections 421A and 421B in the direction parallel to the Z direction. Therefore, when the optical path changing device 5 is removed from the projector 1, first, the first lamp unit 4A and the second lamp unit 4B need to be removed.

Optical Path Change by Optical Path Changing Device

Figure 21:
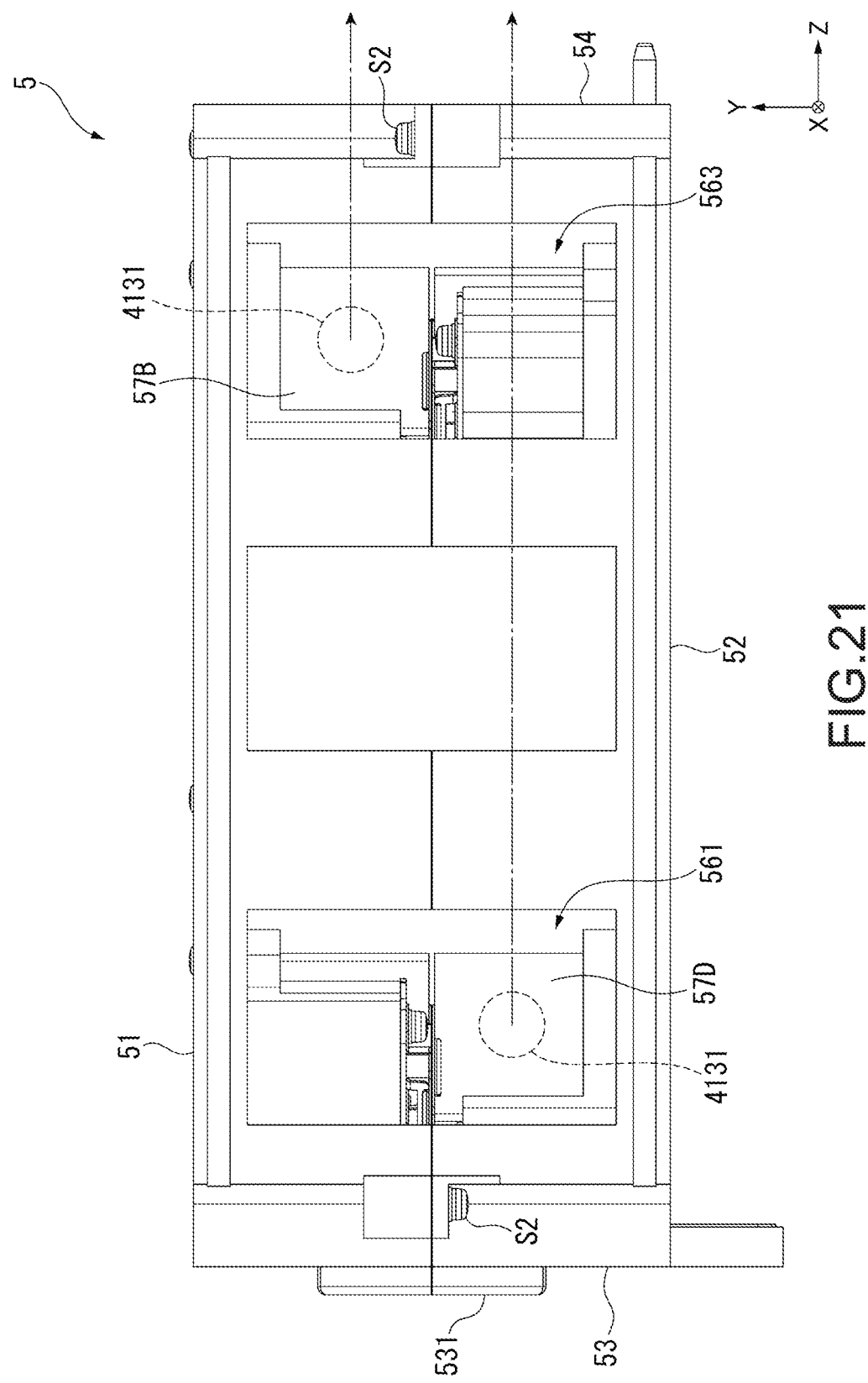
FIG. 21 is a right side view illustrating the optical path changing device according to the embodiment.
Figure 22:
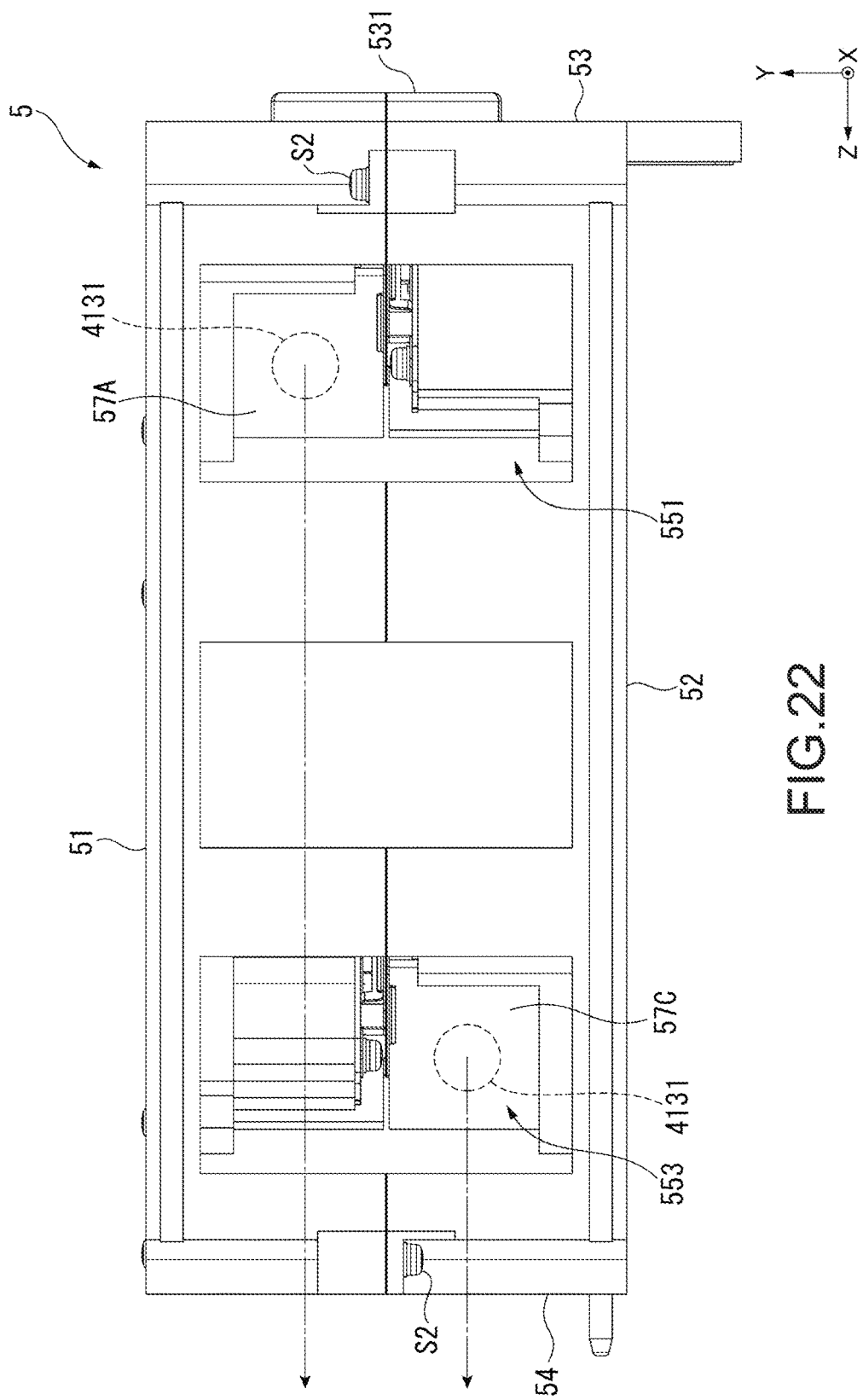
FIG. 22 is a left side view illustrating the optical path changing device according to the embodiment.

FIG. 21 is a side view illustrating the optical path changing device 5 when viewed from the side in the direction opposite to the X direction. FIG. 22 is a side view illustrating the optical path changing device 5 when viewed from the X direction side. Further, in FIGS. 21 and 22, the openings 4131 of the light source devices 41A to 41D corresponding to the reflective mirrors 57A to 57D, respectively, are depicted in a dash line.

According to the configuration described above, the optical path changing device 5 aligns and emits the light beams emitted from the light source devices 41 (41A to 41D) in the Z direction and causes the light beams to be incident to the uniformizing device 32. Specifically, as illustrated in FIGS. 3 and 21, the emitted light beam L41 emitted from the opening 4131 of the light source device 41D is incident to the reflective mirror 57D through the opening 561 of the optical path changing device 5 and is reflected from the reflective mirror 57D toward the Z direction. In addition, as illustrated in FIGS. 3 and 21, the emitted light beam L21 emitted from the opening 4131 of the light source device 41B is incident to the reflective mirror 57B through the opening 563 of the optical path changing device 5 and is reflected from the reflective mirror 57B toward the Z direction.

In addition, as illustrated in FIGS. 3 and 22, the emitted light beam L11 emitted from the opening 4131 of the light source device 41A is incident to the reflective mirror 57A through the opening 551 of the optical path changing device 5 and is reflected from the reflective mirror 57A toward the Z direction. In addition, as illustrated in FIGS. 3 and 22, the emitted light beam L31 emitted from the opening 4131 of the light source device 41C is incident to the reflective mirror 57C through the opening 553 of the optical path changing device 5 and is reflected from the reflective mirror 57C toward the Z direction.

Cooling Path of Optical Path Changing Device

Figure 23:
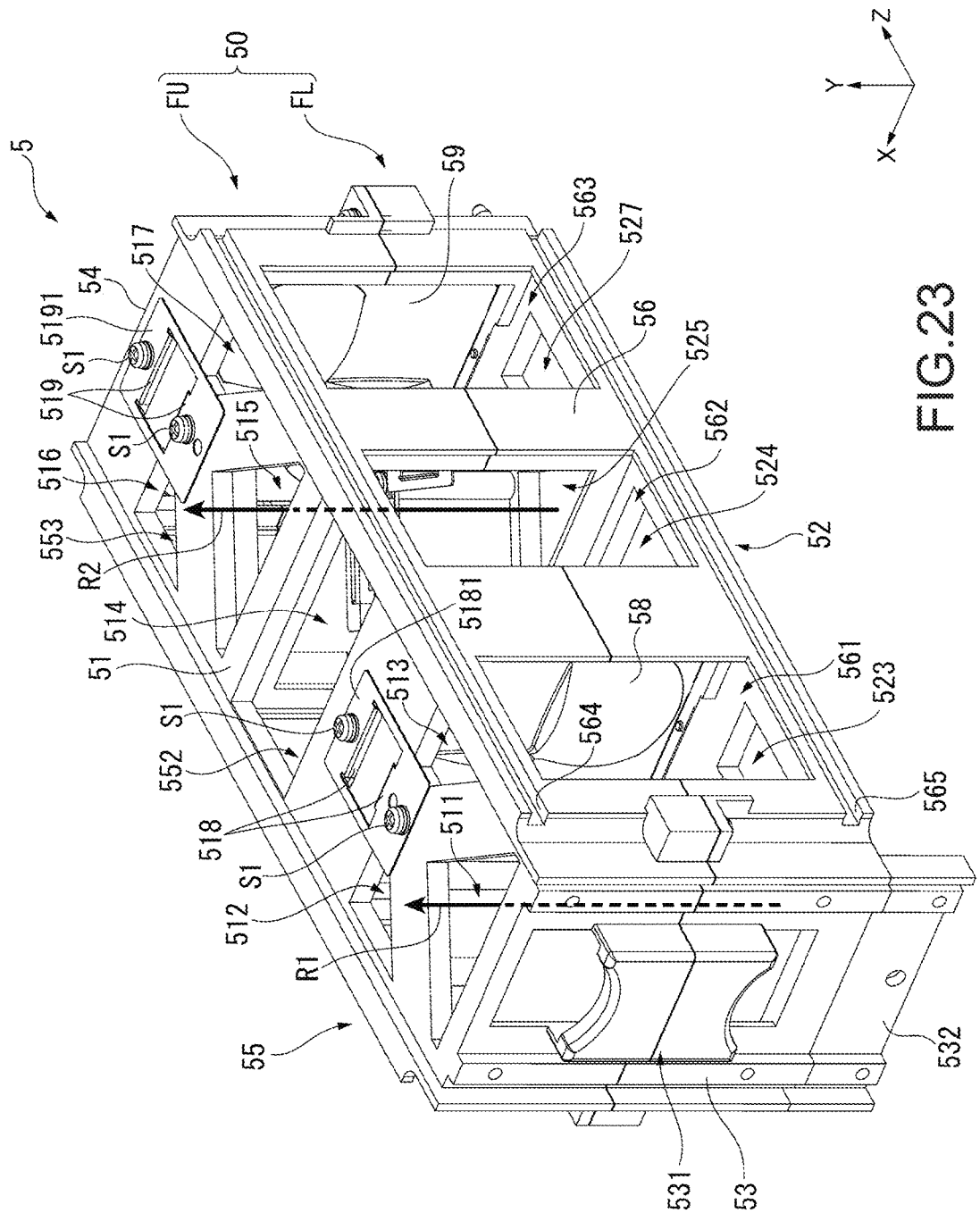
FIG. 23 is a view illustrating a flow path of a cooling gas that cools the optical path changing device according to the embodiment.

FIG. 23 is a view illustrating flow paths of cooling gases R1 and R2 that cool the optical path changing device 5.

The optical path changing device 5 is cooled by the cooling device 9 disposed in the projector 1. Specifically, a duct of the cooling device 9 is disposed on the side in the direction opposite to the Y direction from the optical path changing device 5 (lower surface 52 side) and a projection opening of the duct is disposed at a position facing the openings 521 and 525 of the optical path changing device 5 (not illustrated). In this manner, the cooling gas R1 supplied from the cooling device 9 is circulated from the opening 521 toward the opening 511. In addition, the cooling gas R2 is circulated from the opening 525 toward the opening 515. In this manner, the surface of the holding sections 571A and 571D that hold the reflective mirrors 57A and 57D on the side in the direction opposite to the Z direction is cooled by the cooling gas R1, and the surface of the holding sections 571B and 571C that hold the reflective mirrors 57B and 57C on the side in the direction opposite to the Z direction is cooled by the cooling gas R2. In other words, the cooling gases R1 and R2 cool the holding sections 571A to 571D, thereby, making it possible to cool the reflective mirrors 57A to 57D which are held in the holding sections 571A to 571D. In other words, it is possible to cool the reflective mirrors 57A to 57D without circulating the cooling gases R1 and R2 directly to the reflective mirrors 57A to 57D (reflective surfaces of the reflective mirrors 57A to 57D).

In the projector 1 according to the present embodiment, it is possible to achieve the following effects.

Since the cooling gases R1 and R2 are circulated in the housing 50 in a direction substantially orthogonal to the reflective surface of the reflective mirrors 57A to 57D and to the surface thereof on the side in a direction opposite to the reflective surface, that is, in the direction parallel to the Y direction, it is possible to cool the reflective mirrors 57A to 57D and it is possible to discharge the cooling gases R1 and R2 after cooling the reflective mirrors 57A to 57D, outside the housing 50. Hence, it is possible to efficiently cool the reflective mirrors 57A to 57D.

Dust is contained in the cooling gases R1 and R2 circulating in the housing 50 in some cases and, when the cooling gases R1 and R2 circulate on the reflective surface side of the reflective mirrors 57A to 57D, there is a possibility that the dust will be attached on the reflective surface. In such a case, there is a concern that reflection efficiency of the light beam from the reflective mirrors 57A to 57D will be lowered.

In this respect, in the present embodiment, since the cooling gases R1 and R2 circulate on the side opposite to the reflective surface of the reflective mirrors 57A to 57D, it is possible to lower the possibility that the dust will be attached to the reflective surface of the reflective mirrors 57A to 57D, compared to the case where the cooling gases R1 and R2 circulate on the reflective surface side of the reflective mirrors 57A to 57D. Hence, it is possible to suppress a decrease in the reflection efficiency of the light beam from the reflective mirrors 57A to 57D due to the attachment of the dust.

Since the cooling gases R1 and R2 are circulated to the holding sections 571A to 571D that hold the reflective mirrors 57A to 57D, the holding sections 571A to 571D, to which heat from the reflective mirrors 57A to 57D is transmitted, are cooled by the cooling gases R1 and R2, thereby making it possible to indirectly cool the reflective mirrors 57A to 57D. Hence, it is possible to efficiently cool the reflective mirrors 57A to 57D. Such circulation of the cooling gases R1 and R2 makes it possible to reduce circulation of the cooling gases R1 and R2 on the reflective surface side and makes it possible to reliably reduce attachment of the dust contained in the cooling gases R1 and R2, on the reflective surface.

Since the first frame member FU and the second frame member FL are formed by the aluminum die casting, that is, the holding sections 571A to 571D are formed of the heat conductive material, it is possible to reliably transmit the heat of the reflective mirrors 57A to 57D to the holding sections 571A to 571D, and the cooling gases R1 and R2 circulate to the holding sections 571A to 571D, thereby making it possible to reliably cool the reflective mirrors 57A to 57D.

Since the cooling device 9 causes the cooling gases R1 and R2 to circulate to the openings 521 and 525 in the lower surface 52, it is possible to reliably cool the optical path changing device 5.

Since the first frame member FU and the second frame member FL are configured to have substantially the same dimension in the direction in which the two members are assembled, it is possible to have substantially the same draft in the direction of the assembly of the first frame member FU and the second frame member FL, compared to a case where the housing 50 is configured by assembling of a member having a large dimension in the assembled direction and a member having a small dimension therein. In this manner, it is possible to lower a possibility that the holding sections 571A to 571D formed in the first frame member FU and the second frame member FL, respectively, will warp. Hence, the reflective mirrors 57A to 57D can be fixed to the housing 50 with high accuracy.

In addition, since the first frame member FU and the second frame member FL are formed by injection molding using the same die, it is possible to shorten the manufacturing time and it is possible to reduce manufacturing costs.

Since the first frame member FU and the second frame member FL are molded by aluminum die casting, strength of the housing 50 is improved, it is possible to reduce an occurrence of distortion due to the heat, and it is possible to fix the reflective mirrors 57A to 57D with high accuracy. In addition, since both the first frame member FU and the second frame member FL are molded by the aluminum die casting, it is possible to increase heat conductivity of the housing 50 which is configured of the assembly of the members and it is possible to highly efficiently transmit, to the housing 50 (particularly, the holding sections 571A to 571D), the heat based on the light beams incident to the reflective mirrors 57A to 57D.

In addition, as the optical conversion component, the first lens 58 and the second lens 59 are provided, thereby making it possible to improve general-purpose properties of the optical path changing device 5. In addition, it is possible to fix the first lens 58 and the second lens 59 to the housing with high accuracy.

It is possible to reliably fix the first lens 58 and the second lens 59 to the housing 50 with the leaf spring members 5181 and 5191 and the leaf spring member K with the first lens 58 and the second lens 59 on the first frame member FU side and on the second frame member FL side, respectively. Hence, it is possible to maintain the attachment state of the reflective mirrors 57A to 57D and the first lens 58 and the second lens 59 which are fixed to the housing 50 with high accuracy.

Modification of Embodiment

The invention is not limited to the embodiment described above, but includes alteration, modification, or the like, of the invention within a range in which the objects of the invention are achieved.

In the present embodiment, the openings 511, 515, 521, and 525 are formed at positions at which the cooling gases R1 and R2 are circulated on the side opposite to the reflective surface of the reflective mirrors 57A to 57D (side in the direction opposite to the Z direction). However, the invention is not limited thereto. For example, the openings 511, 515, 521, and 525 are formed at positions at which the cooling gases R1 and R2 are circulated on the reflective surface side of the reflective mirrors 57A to 57D. In this case, it is also possible to cool the reflective mirrors 57A to 57D because the cooling gases R1 and R2 are circulated in the housing 50 in the direction parallel to the Y direction.

In addition, the cooling gases R1 and R2 are circulated through the openings 511, 515, 521, and 525. However, the invention is not limited thereto. For example, the cooling gas may be circulated through all of the openings 511 to 517 and 521 to 527 formed in the upper surface 51 and the lower surface 52, or the cooling gas may be circulated through only a part of the openings.

In the present embodiment, the cooling gases R1 and R2 are circulated from the openings 521 and 525 toward the openings 511 and 515. However, the invention is not limited thereto. For example, the cooling gases R1 and R2 may be circulated from the openings 511 and 515 toward the openings 521 and 525. In this case, similar to the embodiment, it is also possible to efficiently cool the reflective mirrors 57A to 57D.

In the embodiment, the holding sections 571A to 571D are formed of the heat conductive material, that is, are molded by the aluminum die casting. However, the invention is not limited thereto. For example, the holding sections 571A to 571D as separate members may be configured to be attached to the frame member F. In addition, the holding sections 571A to 571D may not be formed of the heat conductive material.

In the embodiment, the first lamp unit 4A includes the light source devices 41A and 41C, and the second lamp unit 4B includes the light source devices 41B and 41D. However, the invention is not limited thereto. For example, the first and second lamp units 4A and 4B may not be provided, and the light source devices 41A to 41D may be directly fixed to the projector 1.

In the embodiment, the first lens 58 and the second lens 59 that collimate the incident light beam are provided. However, the invention is not limited thereto. For example, the optical path changing device 5 may not include the first and second lenses 58 and 59. In this case, the emitted light beams L12 to L42 reflected from the reflective mirrors 57A to 57D may be supplied to the uniformizing device 32.

In addition, the first lens 58 may not be provided and the small lenses 582A and 582D of the first lens 58 may be provided to the second lens 59. Further, instead of the first lens 58, four collimating lenses may be provided for the light source devices 41A to 41D, respectively.

In the embodiment, the first frame member FU and the second frame member FL have substantially the same shape. However, the invention is not limited thereto. For example, the first frame member FU and the second frame member FL may be partially different in shape. Specifically, as long as the first frame member FU and the second frame member FL have substantially the same dimension in the direction (direction parallel to the Y direction) in which the members are assembled, the shapes may be different.

In the embodiment, the frame members F are molded by the aluminum die casting. However, the invention is not limited thereto. For example, the frame members may be molded by magnesium die casting. Further, the frame members F may be formed of a resin or the like.

In the embodiment, the leaf spring members 5181 and 5191 bias the first lens 58 and the second lens 59 to the second frame member FL side and the leaf spring member K biases the first lens 58 and the second lens 59 to the grooves F421, F521, F441, and F541 of the second frame member FL, thereby fixing the frame members to the housing 50. However, the invention is not limited thereto. For example, only one of the leaf spring members 5181 and 5191 or the leaf spring member K may be provided or neither of the spring members may be provided. In addition, instead of the leaf spring members 5181, 5191, and K, a fixing member that fixes the first lens 58 and the second lens 59 may be separately provided.

In the embodiment, the reflective mirrors 57A to 57D are provided to correspond to the light source devices 41A to 41D, respectively. However, the invention is not limited thereto. For example, there may be provided a reflective mirror in which the reflective mirrors 57A and 57D and the reflective mirrors 57B and 57C are integrated.

In the embodiment, the height position of the light source device 41A and the light source device 41B in the Y direction is configured to be higher than the height position of the light source device 41C and the light source device 41D. However, the invention is not limited thereto. For example, the height position of the light source device 41A and the light source device 41B may be lower than the height position of the light source device 41C and the light source device 41D.

In the embodiment, the height position of the light source device 41A is substantially the same as the height position of the light source device 41B, and the height position of the light source device 41C is substantially the same as the height position of the light source device 41D. However, the invention is not limited thereto. For example, the height position of the light source device 41A may be different from the height position of the light source device 41B, and the height position of the light source device 41C may be different from the height position of the light source device 41D.

In the embodiment, the first lamp unit 4A and the second lamp unit 4B are disposed to interpose the optical path changing device 5 therebetween. However, the invention is not limited thereto. For example, the first and second lamp units 4A and 4B may be disposed to be parallel in the Z direction on one side of the optical path changing device 5 or may be disposed to be overlapped in the Y direction. In this case, the reflective mirrors 57A to 57D of the optical path changing device 5 may be disposed at positions corresponding to the light source devices 41A to 41D of the first and second lamp units 4A and 4B.

In the embodiment, as the light modulating device, transmission liquid crystal panels 341 (341R, 341G, and 341B) are used. However, the invention is not limited thereto. For example, instead of the transmission liquid crystal panels 341 (341R, 341G, and 341B), reflective liquid crystal panels may be used. In this case, the color separator 33 may not be provided, and the color synthesis device 344 may perform the color separation and the color synthesis.

In the embodiment, the projector 1 includes the three transmission liquid crystal panels 341 (341R, 341G, and 341B); however, the invention is not limited thereto. In other words, the invention is applicable to a projector using two or less or four or more liquid crystal panels.

In addition, instead of the liquid crystal panel, a digital micromirror device or the like may be used.

In the embodiment, the light source devices 41A to 41D include the luminous tube 411, the reflector 412, and the accommodation body 413. However, the invention is not limited thereto. For example, a light emitting diode (LED), a laser diode (LD), or the like, may be provided.

In the embodiment, the first lamp unit 4A includes the light source devices 41A and 41C and the second lamp unit 4B includes the light source devices 41B and 41D. However, the invention is not limited thereto. For example, the first and second lamp units 4A and 4B may not be provided and the light source devices 41A to 41D may be directly fixed to the projector 1.

In the embodiment, the projector 1 includes the light source devices 41A to 41D. However, the invention is not limited thereto. For example, six or eight light source devices may be provided.

In the embodiment, the image forming device 3 is configured to have a substantial U shape; however, the invention is not limited thereto. For example, an image forming device configured to have a substantial L shape may be employed.

What is claimed is:

1. An optical path changing device comprising:
    a reflective member that reflects a light beam incident thereto, in a predetermined reflection direction;
    a housing holding the reflective member; and
    an optical conversion component that is fixed to the housing and converts an optical property of the light beam reflected from the reflective member,
    wherein
        the housing has a first surface and a second surface with the reflective member interposed therebetween,
        the first surface and the second surface have openings, respectively, and
        a cooling gas is circulated from the opening in the first surface to the opening in the second surface.

2. The optical path changing device according to claim 1, wherein the opening in the first surface and the opening in the second surface are formed at positions, respectively, at which the cooling gas is circulated to a side opposite to a reflective surface of the reflective member.

3. The optical path changing device according to claim 1, wherein the housing has a holding section that holds the reflective member, and
    wherein the opening in the first surface and the opening in the second surface are formed at positions at which the cooling gas is circulated to at least one of the holding section and a surface of the reflective member on an opposite side to a reflective surface thereof.

4. The optical path changing device according to claim 3, wherein the holding section is formed of a heat conductive material.

5. A projector comprising:
    the optical path changing device according to claim 1;
    a light source unit that has a plurality of light sources which emit a light beam toward the optical path changing device; and
    a cooling device that circulates the cooling gas to the opening in the first surface.

6. A projector comprising:
    the optical path changing device according to claim 2;
    a light source unit that has a plurality of light sources which emit a light beam toward the optical path changing device; and
    a cooling device that circulates the cooling gas to the opening in the first surface.

7. A projector comprising:
    the optical path changing device according to claim 3;
    a light source unit that has a plurality of light sources which emit a light beam toward the optical path changing device; and
    a cooling device that circulates the cooling gas to the opening in the first surface.

8. A projector comprising:
    the optical path changing device according to claim 4;
    a light source unit that has a plurality of light sources which emit a light beam toward the optical path changing device; and
    a cooling device that circulates the cooling gas to the opening in the first surface.

9. An optical path changing device comprising: a reflective member that reflects a light beam incident thereto, in a direction; a housing accommodating the reflective member: and an optical conversion component that is fixed to the housing and converts an optical property of the light beam reflected from the reflective member, wherein the housing has a first member and a second member, and the first member and the second member have substantially the same dimension in a direction in which the first member and the second member are assembled.

10. The optical path changing device according to claim 9, wherein the first member and the second member have substantially the same shape.

11. The optical path changing device according to claim 9, wherein the first member and the second member are molded by die casting.

12. The optical path changing device according to claim 9, further comprising:
    a first bias member that is provided in the first member and biases the optical conversion component to the second member side;

a groove which is positioned in the second member and in which the optical conversion component is disposed; and a second bias member that is disposed between the groove and the optical conversion component and biases the optical conversion component toward the inner surface of the groove.

13. A projector comprising:

the optical path changing device according to claim 9; and a light source unit that has a plurality of light source devices which emit a light beam toward the optical path changing device.

14. A projector comprising:

the optical path changing device according to claim 10; and a light source unit that has a plurality of light source devices which emit a light beam toward the optical path changing device.

15. A projector comprising:

the optical path changing device according to claim 11; and a light source unit that has a plurality of light source devices which emit a light beam toward the optical path changing device.

16. A projector comprising:

the optical path changing device according to claim 12; and a light source unit that has a plurality of light source devices which emit a light beam toward the optical path changing device.

* * * * *